(12) United States Patent
Hodge

(10) Patent No.: US 6,703,600 B1
(45) Date of Patent: Mar. 9, 2004

(54) STRUCTURAL MONITORING APPARATUS

(76) Inventor: Malcolm H. Hodge, 485 Mountain Rd., West Hartford, CT (US) 06117

(*) Notice: Subject to any disclaimer, the term of this patent is extended or adjusted under 35 U.S.C. 154(b) by 0 days.

(21) Appl. No.: 10/277,269

(22) Filed: Oct. 22, 2002

Related U.S. Application Data

(62) Division of application No. 09/430,093, filed on Oct. 29, 1999, now Pat. No. 6,476,377.
(60) Provisional application No. 60/106,337, filed on Oct. 30, 1998.

(51) Int. Cl.[7] .................................................. G01D 5/34
(52) U.S. Cl. ........................ 250/227.11; 250/231.13; 356/614
(58) Field of Search ..................... 250/231.13, 231.14, 250/231.16, 231.18, 237 R, 237 G, 227.11, 227.12, 227.26, 227.28, 221; 73/800; 385/12, 13; 356/614, 616, 617, 619, 622

(56) References Cited

U.S. PATENT DOCUMENTS

| | | | |
|---|---|---|---|
| 3,595,072 A | 7/1971 | Richards | |
| 4,602,155 A | 7/1986 | LaPlante | |
| 4,619,143 A | 10/1986 | Franken | |
| 4,647,769 A | 3/1987 | Stone et al. | |
| 4,654,520 A | 3/1987 | Griffiths | |
| 4,654,523 A * | 3/1987 | Tanaka et al. | 250/231.13 |
| 4,678,908 A | 7/1987 | LaPlante | |
| 4,703,255 A | 10/1987 | Strommen | |
| 4,713,540 A | 12/1987 | Gilby et al. | |
| 4,812,645 A | 3/1989 | Griffiths | |
| 4,814,601 A | 3/1989 | Jones | |
| 4,927,503 A | 5/1990 | Polly | |
| 4,958,130 A | 9/1990 | Mochizuki et al. | |
| 4,996,419 A | 2/1991 | Morey | |
| 5,065,017 A | 11/1991 | Hoech | |
| 5,069,774 A | 12/1991 | Hladky et al. | |
| 5,096,277 A | 3/1992 | Kleinerman | |
| 5,179,485 A | 1/1993 | Tamayama | |
| 5,208,162 A | 5/1993 | Osborne et al. | |
| 5,227,930 A | 7/1993 | Thanos et al. | |
| 5,259,944 A | 11/1993 | Feliu et al. | |
| 5,306,414 A | 4/1994 | Glass et al. | |
| 5,403,550 A | 4/1995 | Wietek | |
| 5,426,973 A | 6/1995 | Hartt | |
| 5,895,843 A | 4/1999 | Taylor et al. | |
| 5,900,556 A | 5/1999 | Ahmad et al. | |
| 6,012,337 A | 1/2000 | Hodge | |

FOREIGN PATENT DOCUMENTS

| | | | |
|---|---|---|---|
| EP | 0 503 986 A1 | 9/1992 | |
| JP | 63302305 A | * 12/1988 | ........... G01B/11/00 |

OTHER PUBLICATIONS

Russell O. Stanton, *Digital Optical Transducers for Helicopter Flight Control Systems*, pp. 122–129, 1984.
Wilbur Hicks, *Fiber Optic Bus–Organized Systems for Sensor Data Acquisition and Validation*, pp. 1–17, 1990–1.
Marcos Kleinerrson et al., *A. Distributed Force–Sensing Optical Fiber Using Forward Time Division Multiplexing*, pp. 67–77, 1991.

* cited by examiner

*Primary Examiner*—Kevin Pyo
(74) *Attorney, Agent, or Firm*—Blodgett & Blodgett, P.C.

(57) ABSTRACT

An optical encoder for detecting movement of a first structural element relative to a second structural element. The encoder includes a transmitter portion connected to the first structural element and having first and second optical fibers arranged side by side. Each of the first and second optical fibers has an end surface which lies in a first plane. The encoder also includes a reflector portion connected to the second structural element. The reflector portion has a plurality of spaced reflective surfaces which face the end surfaces and lie in a second plane spaced from and parallel to the first plane so that pulses of light from an interrogation source can be transmitted along one of the first and second optical fibers toward the reflective surfaces and pulses of light reflected from the reflective surfaces can be transmitted along the other of the first and second optical fibers toward the interrogation source.

7 Claims, 18 Drawing Sheets

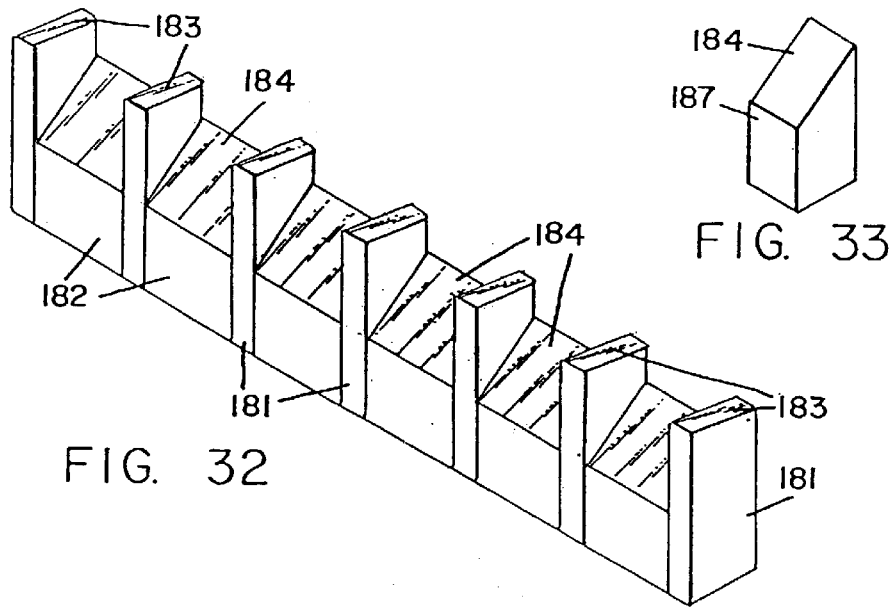
FIG. 32
FIG. 33
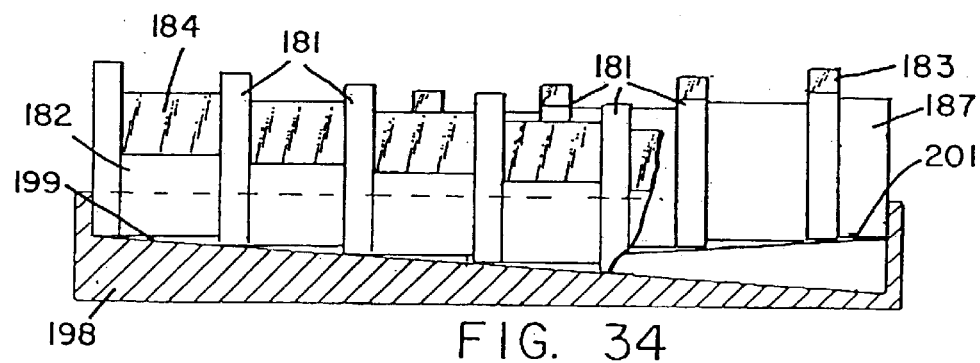
FIG. 34
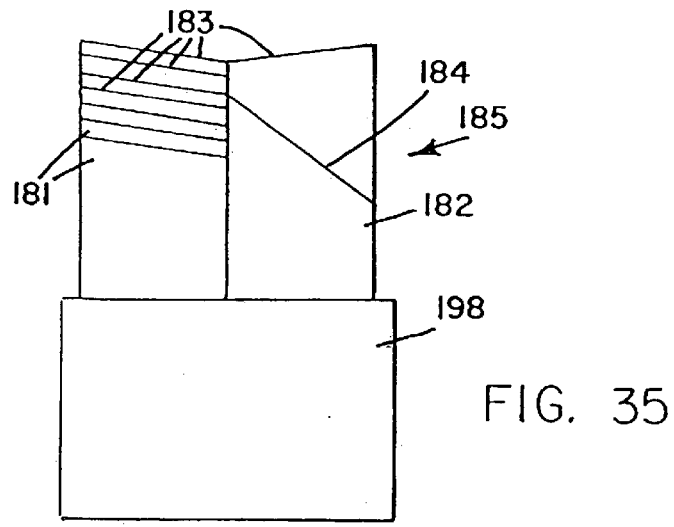
FIG. 35

STRUCTURAL MONITORING APPARATUS

CROSS-REFERENCE TO RELATED APPLICATIONS

This application is a division and claims the benefit under 35 U.S.C. §120 and 121 of prior U.S. application Ser. No. 09/430,093, filed Oct. 29, 1999 now U.S. Pat. No. 6,476, 377; which claims the benefit under 35 U.S.C. §119(e) of prior U.S. Provisional Application No. 60/106,337, filed Oct. 30, 1998; both of which are hereby incorporated by reference.

BACKGROUND OF THE INVENTION

The present invention is directed to a monitoring apparatus for continuous physical integrity monitoring of large civil structures, such as bridges and high-rise buildings, wherein relevant censored data is generated continuously and transmitted to a data gathering location. Specifically, the present invention is an improvement in the optical encoder system and the corrosion monitoring system which are shown and described in my co-pending Patent Cooperation Treaty Application, PCT/US96/20015 filed Dec. 13, 1996 and entitled "Structural Monitoring Sensor System". In this co-pending application, an optical structural integrity monitoring system includes a sensor interrogation harness which exploits a sensor differential technique known as TDM (time-division multi-plexing). Since light travels through an optical fiber at a fixed velocity, each sensor is attached to the pulse laser source by a different length of fiber. Further, by also causing the sensors' output to be reflected back down the same fiber to the photo detector, the differential delay is precisely doubled.

The optical monitoring system of my co-pending application includes a laser or other semi-conductor light source which is capable of generating pulses of light into one leg of a Y-coupler. The other leg of the coupler is connected to a photo detector which, in turn, is operatively connected to circuitry. A cabled bundle of optical fibers is connected to the Y-coupler. A single optical fiber from the cable is connected to each of a plurality of optical sensors located at strategic locations on the structure which is being monitored, in those instances where the direction of motion of the sensor is unambiguous. Each sensor has a "on", or reflecting condition and a "off", or non-reflecting condition. Each light pulse from the laser precedes to the optical cables via the coupler to each of the sensors in the system.

If a sensor is in its reflective condition, some tangible portion of the light pulse will travel back down the same optical fiber and pass through the Y-coupler and on to the photo detector via a cable.

The circuitry of the photo detector is programmed to clock the arrival, or non-arrival, depending on its sensors condition, and certain time windows. These are known and programmed into the computer which will therefore know which sensor is responding in whatever mode, reflected (logical 1), or non-reflective (logical 0). Because the laser is pulsing at a frequency of up to one-half a million cycles per second, 0.5 mhz, there is ample opportunity to capture the change from detectible signal to non-detectible signal without missing a step in the sequence.

Each optical sensor is mounted on a structure to be monitored to detect the relative movement of a first element of the structure relative to a second element of the structure along a first axis. Each sensor comprises a probe which is slidably mounted within a housing. The probe contains a transmissive grid, or reticle. The housing contains a reflective grid, or mask. The reticle moves longitudinally relative to the mask as the probe moves relative to the housing. An optical fiber from the fiber-optic cable extends into the housing so that the end of the optical fiber is at the reticle for transmitting a pulse of light at a right angle to the reticle. Light passing through the transmissive areas of the reticle is reflected by the mask back to the end of the optical fiber. Such a sensor is known as a reflective optical sensor. The invention disclosed in my co-pending application is also applicable to a transmissive optical sensor which is similar to a reflective optical sensor except that the reflective areas of the mask are transmissive areas. Light from the optical fiber passes through the transmissive areas of the reticle and mask and strikes the end of a second optical fiber at the opposite side of the housing for transmission to the Y-coupler. The probe is fixed to a first element of the structure to be monitored. The housing is fixed to the second element of the structure to be monitored. This system is equally applicable to rotary encoder construction with similar reflector geometry.

The reticle and mask are located in separate spaced parallel planes. The mask is mounted in the encoder for moving relative to the reticle in accordance with the relative movement between the first and second elements of the structure to be monitored. The mask and the reticle function as an encoder so that the light pulses received from the laser are reflective to the photo detector. The reticle has a plurality of evenly spaced light impervious surfaces. The areas between the light impervious surfaces are pervious to light. The pervious areas are the active areas of the reticle and the light impervious areas are the passive areas of the reticle. The mask has a plurality of evenly spaced uniform reflective surfaces which are considered the active areas of the mask. The areas between the reflective surfaces are non-reflective and are considered the passive areas of the mask.

The system of my co-pending application also includes use of "quadrature", which allows the direction circuitry to be able to determine the direction of relative movement of the elements of the structure which are being monitored.

My previously disclosed pending PCT patent application describes an incremental encoder with very high resolution but which employs only three optical fibers. The centrally disposed fiber in the linear array delivers light, while the two extreme fibers carry reflected light back to their respective light detectors. The unique placement of the return fibers allows quadrature for directional determination. However, there is no present means for determining the baseline calibration once the power has been turned off.

One of the objects of the present invention is to provide a modification of the basic design of my pending PCT application such that the positive features are retained and so that remote and automatic recalibration is also possible.

Another object of the present invention is the provision of a corrosion monitoring system which is sensitive to small corrosion changes in corrodible materials being monitored.

A further object of the present invention is the provision of a corrosion monitor which is versatile for monitoring a variety of substances, is easily installed, relatively simple in construction and operation and reliable for an extended period of use.

In the monitoring system of the present application, two fibers are used for each encoder. Instead of using two fibers per sensor and making the light pulse go up and back, each of them independently, two fibers are placed in one connector and excited alternately by a pulse of light. In this way, the fiber which is not emitting a light pulse can receive it from the other and vice versa. This makes the system a continuous loop rather than an up and back along the same fiber. This is achieved by having two identical harnesses of fibers rather than having one harness longer than the other and equipping each harness with its own laser and photo diode. This improvement produces a very significant advantage. Back reflection is no longer a problem because the signal which is to be detected comes from the harness which is not pulsing so that there are zero cross-talk considerations. Also, since the time delay line is no longer needed, the sensors can be spaced much closer together for the same delay. Quadrature adjustment can be achieved by rotating the two fiber connector until the fiber offset precisely matches one-quarter of the mirror spacing. In the preferred embodiment, the mirror portion of the encoder is made essentially from a threaded rod sliding in a tube. The tops of the thread are polished down to the point where these mirrors are spaced at the desired two-to-one ratio. The fiber cores themselves constitute the other grid for most applications, making the system very simple and cost-effective.

BRIEF DESCRIPTION OF THE DRAWINGS

The character of the invention, however, may be best understood by reference to one of its structural forms, as illustrated by the accompanying drawings in which:

FIGS. 22 and 23 are vertical fragmentary cross-sectional views similar to. FIGS. 20 and 21 showing a variation in the indicator portion of the corrosion monitor;

FIG. 32 is an isometric view illustrating an arrangement of shims having reflective surfaces and deflective surfaces for forming a binary optical reflector module;

FIG. 33 is an isometric view of a third type of shim having a deflective surface for forming a binary optical reflector module with the shims of FIG. 32;

FIG. 34 is a vertical cross-sectional view of a base mold to be used with the shims of FIGS. 32 and 33 for forming a binary optical reflector module;

FIG. 35 is an end view on an enlarged scale of the base mold of FIG. 34 and carrying the shims of FIGS. 32 and 33;

DETAILED DESCRIPTION OF THE INVENTION

Figure 1:
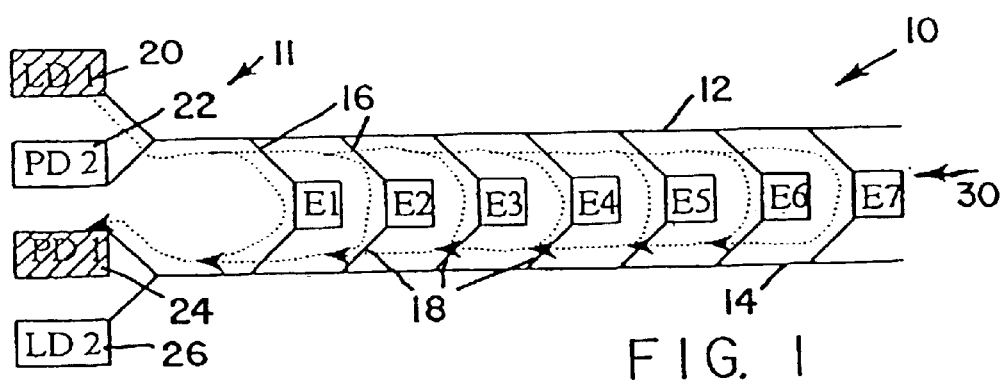
FIG. 1 is a diagrammatic view of an optical monitoring system embodying the principles of the present invention which utilizes a plurality of encoders controlled by a single interrogation system.

Referring to FIG. 1, the optical monitoring system of the present invention comprises an interrogation system, generally indicated by the reference numeral 10. The interrogation system 10 includes a pair of illumination cables 12 and 14 connected to the light transmitting and receiving module, generally indicated by the reference numeral 11. An optical fiber 16 from the cable 12 is connected to each of a plurality of encoders E1–E7. An optical fiber 18 from the cable 14 is connected to each of the encoders E1–E7. Cable 12 is connected to a splitter so that each of the fibers 16 is operatively connected to a first laser diode 20 and a first photo detector 22. The cable 14 is connected to a splitter so that each of the optical fibers 18 is operatively connected to a second photo detector 24 and to a second laser diode 26. In the quadrature channel one phase of operation, the laser diode 20 excites one half of the quadrature of every encoder using different length fibers for time division multi-plexing to photo detector 24. In the quadrature channel two phase of operation, the laser diode 26 illuminates the quadrature channel two half of the quadrature by the reverse excitation. Photo detector 24 is off when the laser diode 26 is on and reflected lights from any of the encoders E1–E7 is received by photo detector 22.

Figure 2:
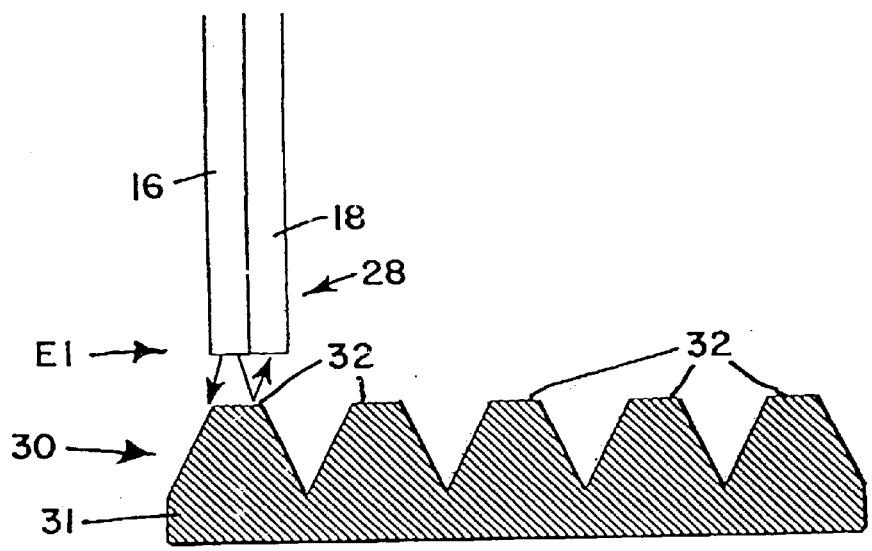
FIG. 2 is a diagrammatic view of a single encoder showing the relationship between the encoder strip and transmissive of optical fibers.
Figure 3:
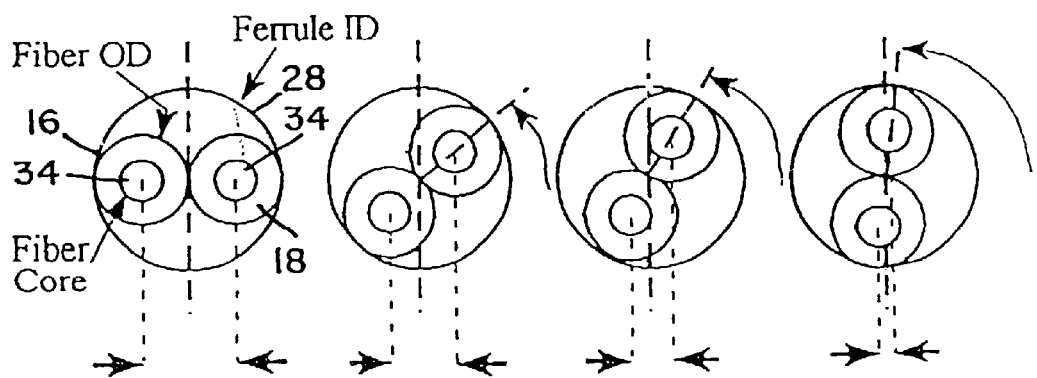
FIG. 3 is a diagrammatic view illustrating quadrature for the encoder of FIG. 2.

The encoders E1–E7 are configured so that fibers 16 illuminate fibers 18 and vice versa. Referring to FIG. 2, each encoder, as for example in encoder E1, comprise a transmitter portion, generally indicated by the reference numeral 28 and a reflector portion, generally indicated by the reference numeral 30. In the preferred embodiment, the encoder strip is a threaded rod, wherein the tops of the thread are polished to a mirror-like finish. The spacing between each photo reflective surface is twice that of the longitudinal dimension of each photo reflective surface. The photo reflective surfaces are spaced at a two to one ratio. The reflector portion 30 comprises an encoder strip 31 which has a plurality of spaced photo reflective surfaces 32. The transmitter portion 28 includes a ferrule or connector, not shown, which carries a fiber 16 from cable 12 and a fiber 18 from cable 14. Each of the cables 12 and 14 is dedicated to a specific quadrature channel of the encoders. The fiber 16 and 18 are located side-by-side within the ferrule so that the polished ends of the fibers are disposed facing the reflective surfaces 32. Each transmitter portion of the encoder is connected to a first structural element to be monitored and the reflector portion 30 is connected to a second structural element to be monitored. Relative movement between the structural element causes relative movement between the mirrored surfaces 32 and the ends of the fibers 16 and 18 as described in my co-pending application. The two fibers deployed side-by-side in the same ferrule will naturally be displaced by up to five mils. This is slightly more than the 2–3 mils anticipated for accurate quadrature. Quadrature adjustment is achieved by rotating the ferrule about its axis, this changes the relative positions of the two fibers relative to the reflective surfaces 32 to allow for accurate tuning of the quadrature offset as shown in FIG. 3. The relative lateral displacement of the optical core 34 of each fiber within the connector ferrule is clearly a function of the angle of rotation of the ferrule about its axis relative to the reflective surfaces 32.

Figure 4:
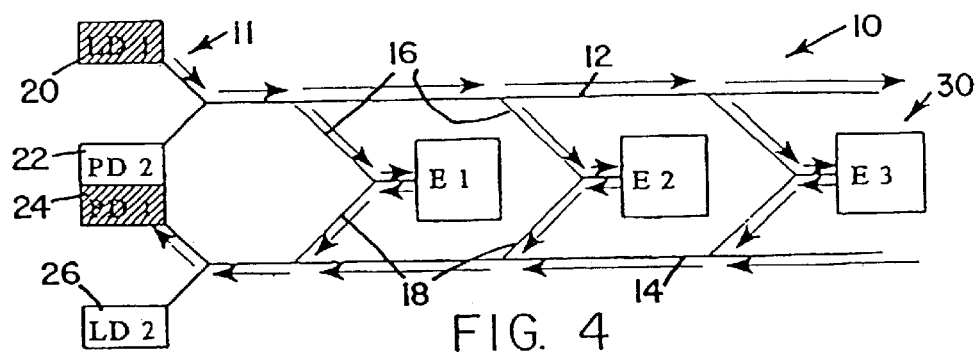
FIG. 4 and 5 are diagrammatic views illustrating the use of laser diodes for generating photo pulses to the encoders.
Figure 5:
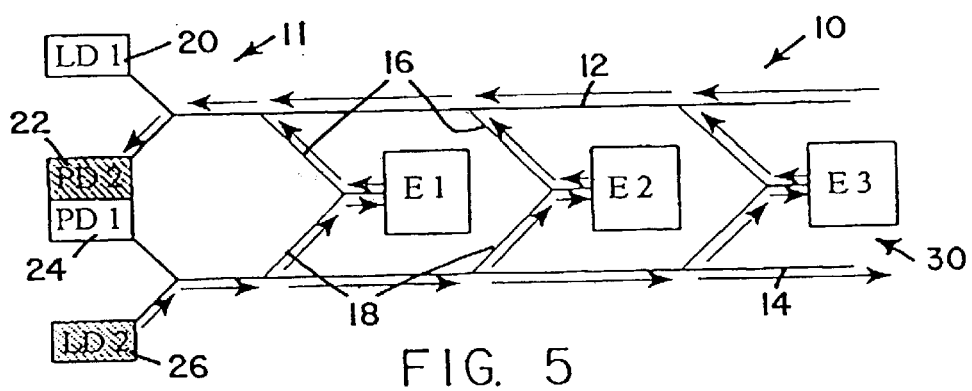

As illustrated in FIGS. 4 and 5, laser diodes 20 and 26 pulse alternately, so that photo detectors 22 and 24 may be shut off while not required. The alternating functions of these elements are shown in FIGS. 4 and 5.

As an example, the following calculations relate to an optical budget for 20 sensor system. Loss due to reflection displacement as depicted in FIGS. 6 and 7 is at least 13 dB, the area lost is the ratio of an output circle of 2.46 mil diameter and a return circle of 10.0 mil. diameter.

Figure 6:
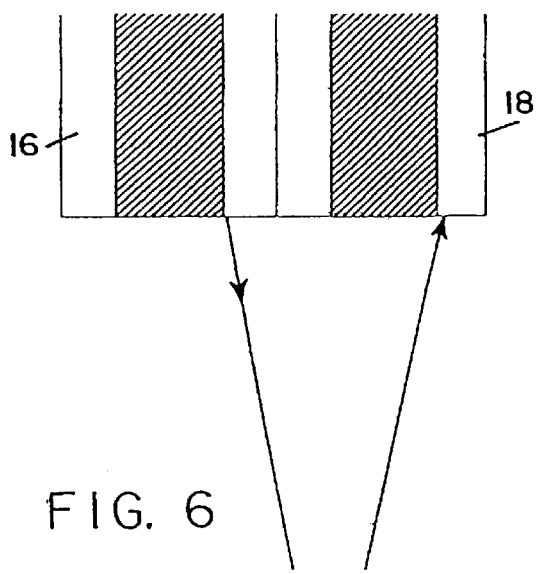
FIGS. 6 and 7 are diagrammatic views illustrating reflection displacement loss for the encoder strip and the dual optical fibers of the encoder.
Figure 7:
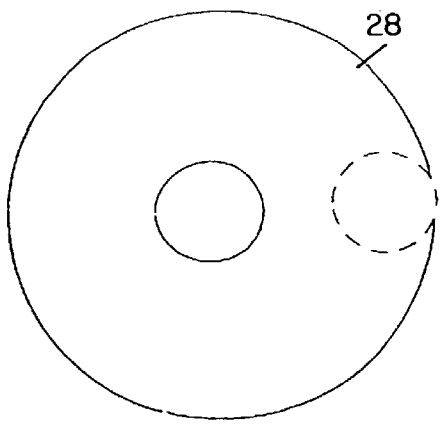
Figure 8:
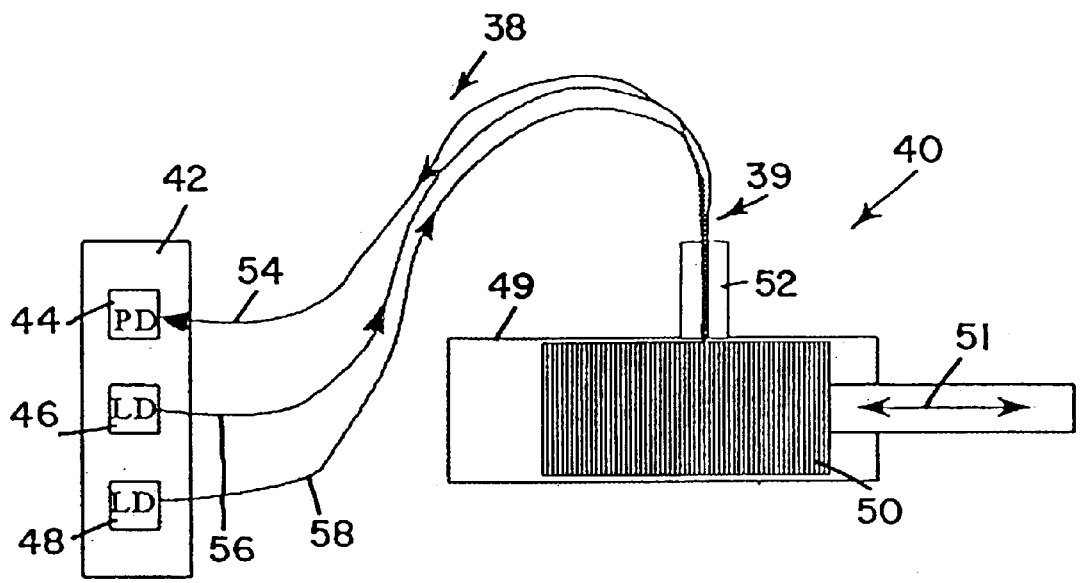
FIG. 8 is a diagrammatic view of a fiber optic interrogation system for a single encoder system, utilizing three optical fibers.

Optical Budget for 20 Sensor System:

Loss due to reflector=13 dB (See FIG. 6)

Coupler size minimum: Area=20×(Fiber Area+Packing Fraction of 15%

Area=20×(1.964+0.295)×10$^{-5}$=4.518×10$^{-4}$"

Diameter Coupler=0.024"=24 mil=600 microns

Area Loss per channel: Loss=10 log$_{10}$ (62.5$^2$/600$^2$)w)=20 dB

Loss due to splitter=4 dB

Loss due to system, connectors, etc.=10 dB

Add 13 dB for SNR enhancement

TOTAL BUDGET=60 dB (Including 23 dB of slush)

INTERROGATION SYSTEM EMPLOYING A SINGLE ENCODER

Referring to FIGS. 8–11, there is shown an interrogation system, generally indicated by the reference numeral 38 which employs a single encoder, generally indicated by the reference numeral 40. The encoder 40 is connected to a modem 42 by an optical cable, generally indicated by the reference numeral 39. The modem 42 contains a photo detector 44 and two LEDS (light emitting diodes) 46 and 48. An optical fiber 54 of the cable 39 is connected to a photo detector 44. Optical fibers 56 and 58 from the cable 39 are connected to the LEDS 46 and 48, respectively. The optical encoder 40 includes a housing 49 and encoder shaft 50 mounted within the housing 49 for movement relative to the housing in the direction of arrow 51. The ends of the optical fibers 54, 56, and 58 are located within a connecting ferrule 52 which is fixed to the encoder body 48. The polished end surfaces of the fibers 54, 56 and 58 are parallel with an array of photo reflective surfaces or mirrors 60 which move with the encoder shaft 50. The relative movement between the mirror array 60 and the fibers 54, 56, and 58, are indicated by the arrow 62 in FIG. 9. Interrogation system 38 is a single dedicated electro optic circuit which differs from the time division multi-plexed harness described in connection with the interrogation system 10 which employs a plurality of encoders. The interrogation system 38 is an autonomous motion sensor which is ideal for machine tools and other applications which normally employ linear variable differential transformers.

The two transmitting fibers 56 and 58 are mutually disposed in a quadrature arrangement. This is accomplished by arranging for the connector ferrule 52 to be oriented so that the two light emitting ends of the fibers 56 and 58 are set at a 90°–270° displacement versus a 360° periodicity of the mirror array 60. This serves to indicate the direction of traverse of the mirrors relative to the fiber ends. The circle of light reflected back from the mirror array 60 encompasses the single return fiber 54 which results in a signal being transmitted to the photo detector 44. The modem 42 contains electrical circuitry for indicating which LED 46 and 48 is responsible for the reflection pulse.

Figure 9:
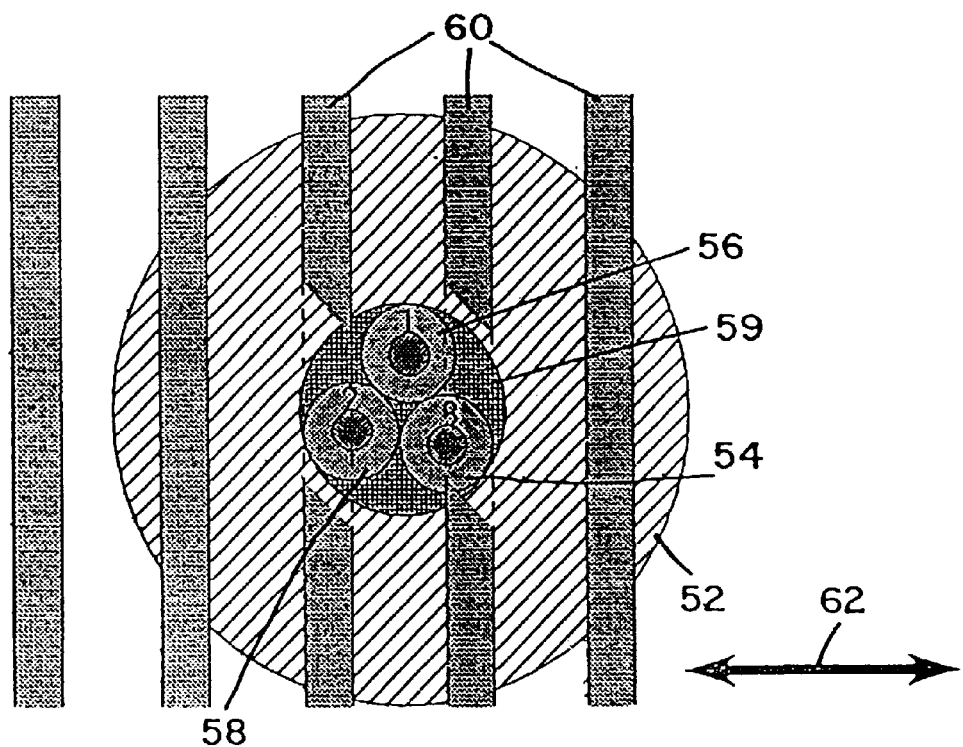
FIG. 9 is a diagrammatic view showing the special relationship between the mirror array of the encoder strip and the three optical fibers of the single encoder of FIG. 8.

Referring specifically FIG. 9, the relative locations of the light emitting fibers 56 and 58 are shown with respect to both the single light receiving fiber 54 and the linear mirror array 60. In FIG. 9, portions of the mirror array 60 in line with the fibers 54, 56 and 58 are shown broken away. It is clear from FIG. 9 that a tangible portion of light from fiber 58 is reflected by the mirror strip with which is it aligned. Some of the light reflected by the mirror strip will be picked up by the receiving fiber 54. Fiber 56 will not have any of its light reflected, since it is disposed between mirror strips 60. Therefore, if the fiber elimination sequence were 56, 58, then the signal sequence would be 0,1. If the mirror array 60 were moved to the left as viewed on FIG. 9 by half a period so that fiber 56 were aligned with a strip 60 and fiber 58 were between mirror strips 60, the same illumination sequence of 56, 58, would yield a reverse signal sequence of 1,0. If the mirror array 60 were moved to the right as viewed in FIG. 9, relative to the ferrule 52, by half an interval period, then both transmitting fibers 56 and 58 would be in line with the same mirror strip 60 to produce a 1,1 sequence. This illustrates the concept of quadrature, the quarter period offset between two emitters, which enables the control system as the modem 42 to know which way the mirror array 60 is moving, relative to the connector ferrule 52. This also increases the resolution of the mirrors in motion by a factor of 4.

Figure 10:
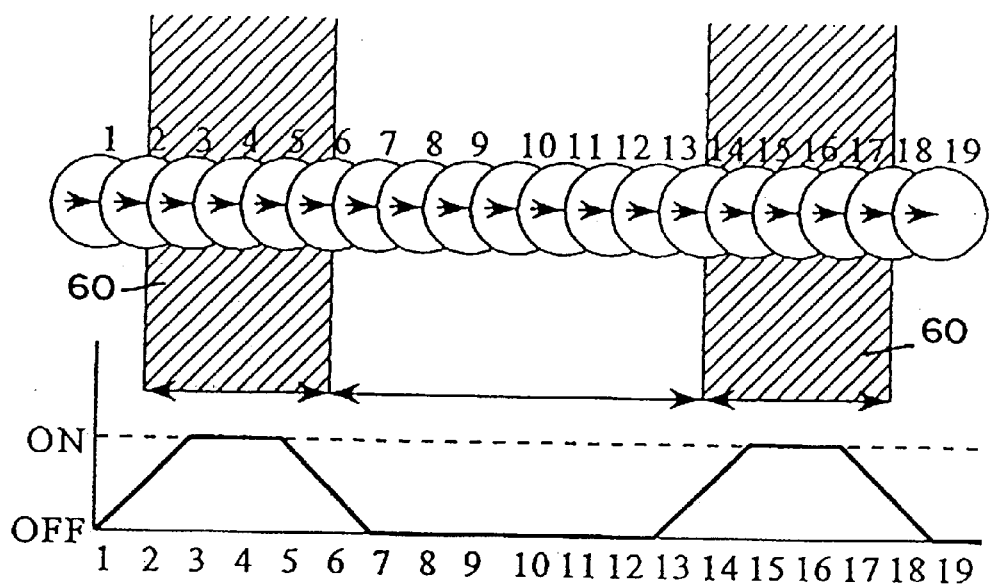
FIGS. 10 and 11 are diagrammatic views illustrating structural switching achieved by rotating the connector ferrule of the encoder of FIG. 8.
Figure 11:
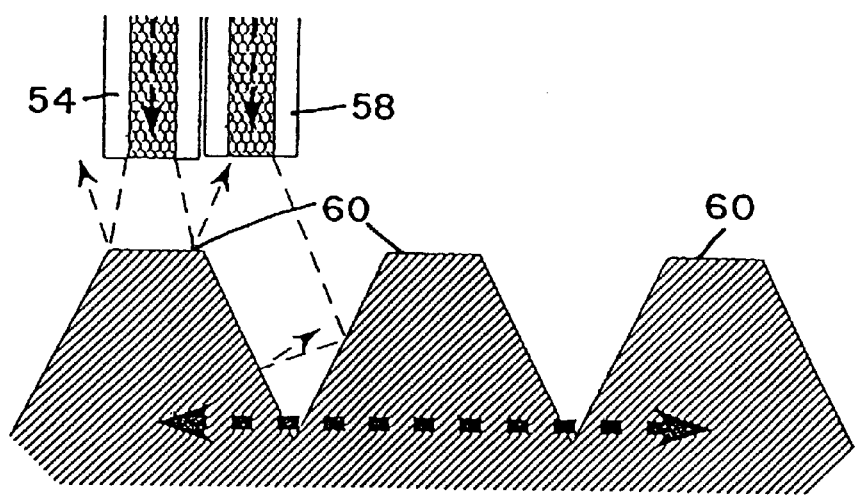

Referring to FIGS. 10 and 11, structural switching is achieved by rotating the connector ferrule relative to the housing about its central longitudinal axis so that the light receiving fiber 54 occupies the position of the transmitter fiber 56 and the transmitter fiber 58 occupies the position of the receiver, fiber 54 as viewed in FIG. 9. In the side elevational view of FIG. 11, the light receiving fiber 54 is behind the light transmitting fibers 56 and 58. The on-off sequence of a mirror/optical fiber layout is depicted in FIG. 10 for a plurality of incremental movement of the mirror array 60, relative to the connector ferrule 52. In the examples shown in FIG. 10, the fiber diameter is 2 mils, the width of each mirror strips is 4 mils and the gap between mirror strips is 8 mils.

MODIFIED OPTICAL ENCODER

Figure 12:
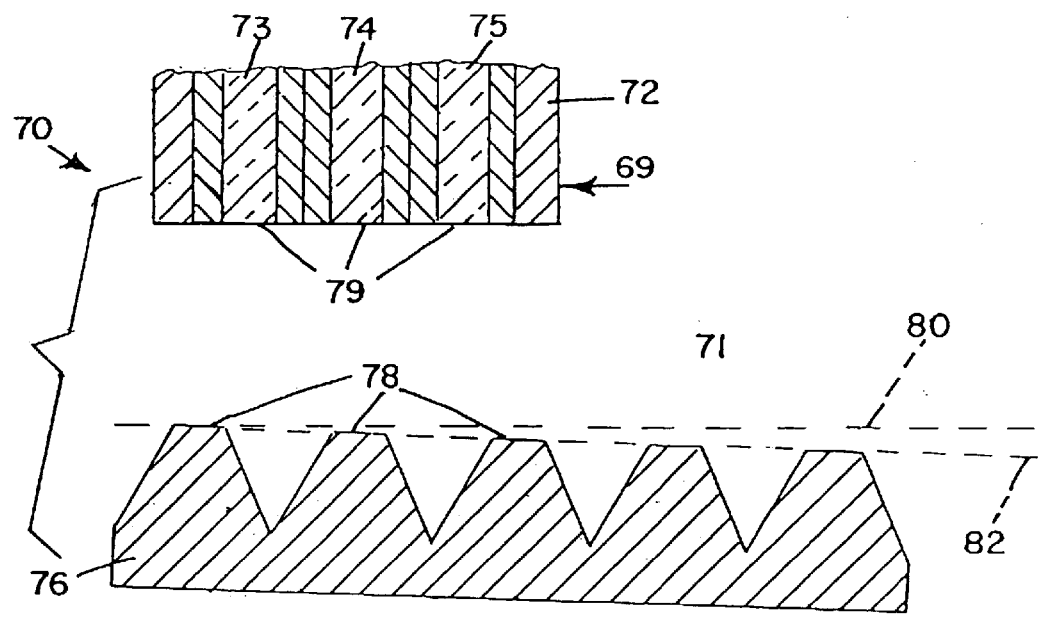
FIG. 12 is a diagrammatic view of a modified encoder, utilizing a three fiber system and an encoder strip which progressively closes on or separates from the optical fibers as the strip moves longitudinally relative to the optical fibers.
Figure 13:
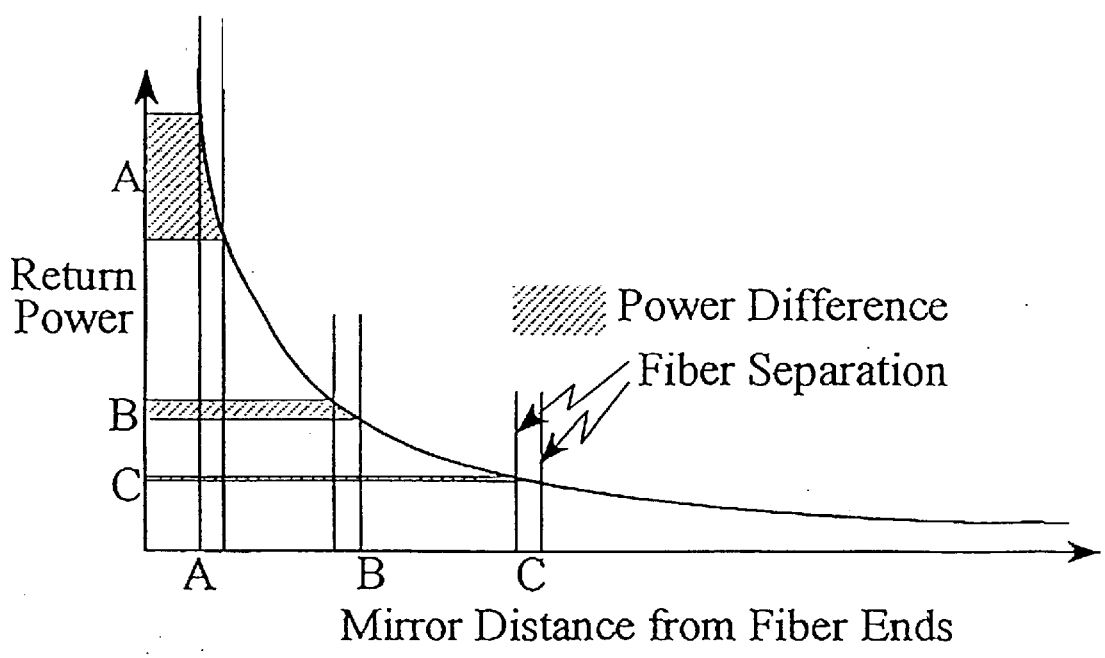
FIG. 13 is diagrammatic view of the encoder of FIG. 12 comparing light intensity with distance between the optical fibers and reflective surfaces of the encoder strip.

Referring to FIGS. 12 and 13 there is shown a modified optical encoder, generally indicated by the reference numeral 70. The encoder 70 includes a connecting ferrule 72 which contains three spaced optical fibers 73, 74, and 75 and an encoder strip 76 which has a plurality of incrementally spaced mirrors or photo reflective surface 78. Each of the optical fibers 73, 74, and 75 has an end surface 79 which is parallel to a plane 80. The reflective surfaces 78 are located in a plane 82 which is at an angle to the plane 80. Optical fiber 74 is an output fiber. Optical fibers 73 and 75 are input fibers. Light from the modem 42 is transmitted to the reflective mask 76 via the fiber 74. Reflected light from the reflective mask 76 is returned to the modem 42 of the interrogation system 38 via the fibers 73 and 75.

The mask 76 moves relative to the connecting ferrule 72 along an axis which is parallel to the plane 80 so that the reflective surfaces 78 will move progressively closer or further from the surfaces 79 of the optical fibers 73, 74, and 75. Alternatively, the surfaces 78 of the reflective mask 76 can be located along the plane 80 and the mask 76 can be moved along an axis which is parallel with the plane 82. This will also move the surfaces 78 of the mask progressively closer or further from the surfaces 79 of the optical fibers, depending on which direction the mask is moved relative to the connecting ferrule 72.

A key attribute of the encoder portion of my co-pending PCT application is a reticle-mask design which always delivers equally-spaced 'one' and 'zero' bits, regardless of the illumination power level. It is this insensitivity to digital bit recognition which allows a self-calibration which provided by encoder 70 and described below.

It is well known that the intensity, I, of reflective light received from a divergent source is related to the inverse distance, d, squared: $I=1/d^2$ This arrangement will cause the intensity of reflected light to broadly diminish as the mask moves in the lateral direction which carries the mirrors further from the fiber array.

This does not have a negative effect on the encoder's ability to create and display equal 'ones' and 'zeros'. As such therefore, this slight modification to the original incremental encoder design does not affect its digital function.

As illustrated in FIG. 12, the 'upstream' return fiber 73 will always be closer to the tilted mirror surface than the 'downstream' return fiber 75. Thus, and due to the $1/d^2$ intensity relationship, the upstream fiber 73 should always see a higher intensity than the downstream fiber 75, given identical mirror deployment.

This difference in intensity will not always remain constant, however, as shown graphically in FIG. 13.

Although the return fiber 73 is always closer to the reflective surfaces 78 than the return fiber 75, the ratio between the peak or averaged powers received by the fibers changes as the reflective surfaces move toward or away from the end surfaces 79 of the optical fibers 73, 74, and 75. This is shown graphically in FIG. 13 for three different positions A, B, and C of the mask 76, relative to the connecting ferrule 72.

The invention takes advantage of the obviously diminishing ratio in signal strength received by the two return fibers. This can be carried out by noting the peak output of each quadrature bit as the mirror passes completely through its respective maximum reflectance position. However, a more reliable method for an encoder undergoing extensive 'dither', i.e., oscillatory motion as would be experienced by a vibrating bridge, would be to accumulate the individually-received returning power over a fixed period and then to average it for both fibers before ratioing. As can be seen in the A, B, and C exemplars of FIG. 13, the ratio derived by either method will be most indicative of the position on the encoder where the unique ratio derives from.

The inventive disposition of the reflective mirror array at an angle to the encoder's axis allows a positive analog determination of the mask's position relative to the optical fibers. This is accomplished without the need for extra hardware by merely manipulating already existing signal power level data. This creates the ability to retain high resolution incremental digital encoder performance and relate to the absolute encoder mask position.

FUNCTIONAL CALCULATION FOR THE MODIFIED ENCODER 70

Verification of the Principle

Intensity, I, of reflected light is proportional of $1/d^2$, or $I=k/d^2$ where k=arbitrary constant.

For the two adjacent receiving fibers which are set at different heights, 1 & 2, from the angled reflecting grid, the respective intensities are:

$$I_1=k/d_1^2, \text{ and}$$

$$I_2=k/d_2^2.$$

The ratio of $I^1$ and $I^2$ will give an indication of the placement of the two fibers with respect to the distance away of the grid and hence its absolute position:

$$R=I^1/I_2.$$

Because the grid will always be referenced from Fiber #1, the distance $d_1$ will be used. The difference in distance between $d^1$ and $d_2$ will be designated $\Delta$, and from this point on, $d_1$ will be designated as d. Therefore, $$d_2 = d + \Delta$$

Therefore, $$R = [k/d_2]/[k/(d+\Delta)^2] \text{ or}$$

$$R = d_2/(d+\Delta)^2$$

This math demonstrates how the change in the ratio of intensities of the two return fibers will go as the square of the distance.

Relationship to Encoder

Note that the relationship between the difference in distance, $\Delta$, and the separation of the two fibers, L, and the slope of the grid, $\ominus$, will be:

$$\Delta = L \cdot \tan \ominus$$

Therefore the complete relationship between the ratio of signal strengths and the encoder geometry is:

$$R = d^2/(d + L \cdot \tan \ominus)^2$$

In practicality, only d changes in value for a given encoder, $L \cdot \tan \ominus$ being a constant. As d gets larger, the difference between the numerator and denominator diminishes as a square function with grid placement, giving us the unique and absolute grid placement.

$$R = d^2/(d+K)^2 \text{ where } K = L \cdot \tan \ominus$$

Derivative Corroboration

The change of R with d is a derivative:

$$\delta R/\delta d = [(d+K) \cdot 2d - (d^2)]/(d+K)^2$$

$$= [2d^2 + 2dK - d^2]/(d+K)^2$$

$$= (d^2 + 2dK)/(d^2 + 2dK + K^2)$$

As expected, this is a function which is zero when d=0 and asymptotically approaches 1 as d becomes very large compared with K, effectively making the numerator and denominator the same.

The second derivative will confirm the absence of a maximum or minimum between the two extremes of 0 and $\infty$.

$$\delta R/\delta d = [(d+K)^2 \cdot (2d+K) - (d^2+2dK) \cdot (2d+2K)]/[(d+K)^4]$$

$$= \{2(d+K) \cdot [(d+K)^2 - d^2 + 2dK)]\}/[(d+K)^4]$$

$$= \{2(d+K) \cdot [(d+K)^2 + 2dK + K^2 - d^2 - 2dK]\}/[(d+K)^4]$$

$$= 2(d+K) \cdot (K^2)/(d+K)^4$$

$$= 2K^2/(d+K)^3$$

As expected, this function goes to zero when d>>K, and to infinity when d+−K. That is, the further away the mirror goes from the two fibers, the less rate of change with change in differential power return there will be.

Design Optimization

Therefore, optimization of the encoder design will be one of selecting a grid repetition pitch which will give the relative fiber placement, L. and selecting the lowest possible differential power ration, R, which can be practically discerned. Once L and R are known, then $d_{min}$ and $d_{max}$ will be known which, in turn, will dictate slope angle, $\ominus$.

Based on a pitch of 10 mil, we have fiber separation, L, of 2.5 mil. If we take as a minimum ration, R, between the two fibers 0.01%, or R=0.9999, we can calculate $d^{max}$:

We have seen that $R = d^2/(d+\Delta)^2$,

And $\Delta = L \cdot \tan \ominus$,

And the resulting $R = d^2/(d + L \cdot \tan \ominus)^2$.

We know that the maximum angle the grid may be is 5°, and so we can calculate $d_{max}$, using R=0.001. First rearrange the equation:

$$R = d^2/[d^2 + 2dL \cdot \tan \ominus + (L \cdot \tan \ominus)^2]$$

$$Rd^2 + 2RdL \cdot \tan \ominus + R(L \cdot \tan \ominus)^2 - d^2 = 0$$

or $d^2(R-1) + d \cdot 2RL \cdot \tan \ominus + R(L \cdot \tan \ominus)^2 = 0$

Solve for $d_{min}$:

$$d_{max} = -2RL \cdot \tan \ominus +/- \{(2RL \cdot \tan \ominus)^2 - 4(R-1) \cdot R \cdot (L \cdot \tan \ominus)^2\}^{0.5}/2(R-1)$$

Where:: L=2.5; R=0.99999; $\ominus$=5°.

$$d_{max} = (-0.17496 - 0.17501)/(-0.0002)$$

$$d_{max} = 1750 \text{ mil.}$$

Example Result

This indicates that a fiber-to-fiber discrimination of 0.0001, or 0.01% could be discriminated at a separation between the two fibers and the grid of 1.75". Starting with a separation of 0.015", this would equate to a grid length of (1.75−0.015)/tan 5° and with fibers 2.5 mil apart on a pitch of 10 mil.

Power Calculations

The power loss in such a system would be equivalent to a circle expansion after 2×1.75" round trip divided by a circle of 2 mil diameter.

The size ration is $(0.001)^2/(1.75 \times 2 \times \tan 15°)^2 = 1.5 \times 10^{-6}$.

The loss associated with this would be $10 \cdot \log_{10}(1.5 \times 10^{-6}) = 58.2$ dB.

This is just doable with a continuous output source of 0 dBm, or 1 milliwatt. Under less stringent conditions, however, encoders of shorter throws would be readily achievable from a budget standpoint.

Figure 14:
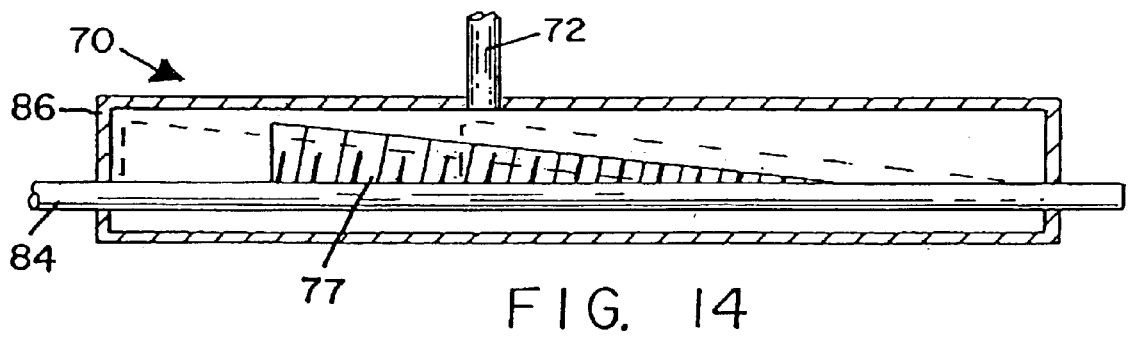
FIG. 14 is a diagrammatic view of an encoder assembly showing the relationship between the connecting ferrule and the encoder strip.

Referring to FIG. 14, there is shown a variation of the optical encoder 70 wherein the encoder strip 76 is replaced by a wedge shaped encoder strip 77. The encoder strip 77 is fixed to an encoder shaft 84 which is located within a housing 86. The connecting ferrule 72 containing the optical fibers is connected to the housing 86. The shaft 84 moves axially relative to the housing 86. The encoder strip 77 has a plurality of spaced photo reflective surfaces, not shown, which face the end of the connecting ferrule 72. A mid position of the encoder strip 77 relative to the connecting ferrule 72 is shown in full lines in FIG. 14. The two extreme positions of the encoder strip 77 are showed by the dotted lines.

Figure 15:
FIG. 15 is a side elevational view of a threaded rod used for making a pair of encoder strips.
Figure 16:
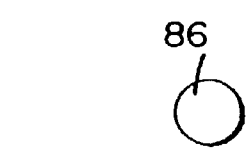
FIG. 16 is an end view of the threaded rod of FIG. 15.
Figure 17:
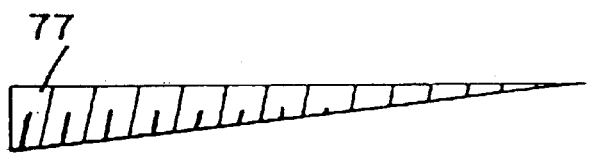
FIG. 17 is a side elevational view of an encoder strip made from the threaded rod of FIG. 15.

FIG. 15 illustrates a method of forming encoder strip 77 from a threaded rod 86. The rod 86 is cut diagonally along its length along the dotted line 88 to form a pair of encoder strips 77, one of which is illustrated in FIG. 17. The tops of the helical threads of the rod 86 are polished to mirror-like finish and constitute the photo-reflective surfaces of the encoder strip 77.

Quadrature can be achieved for the three fiber system shown in FIG. 14, by partial rotation of the ferrule 72 to adjust the orientation of the fibers relative to the longitudinal axis of the encoder strip. The calculations for one dimensional example of a three fiber encoder is set forth below in conjunction with FIGS. 18 and 19.

For an encoder having 100 lines per inch, we will have a 10 mil pitch. One quarter of this is 2.5 mil, the necessary quadrature delay. This means that the offset between the two cores along the longitudinal axis of the encoder strip will have to be 2.5 mil or 7.5 mil, i.e., 90° or 270°, arbitrarily depending upon whether it is leading or trailing.

Figure 18:
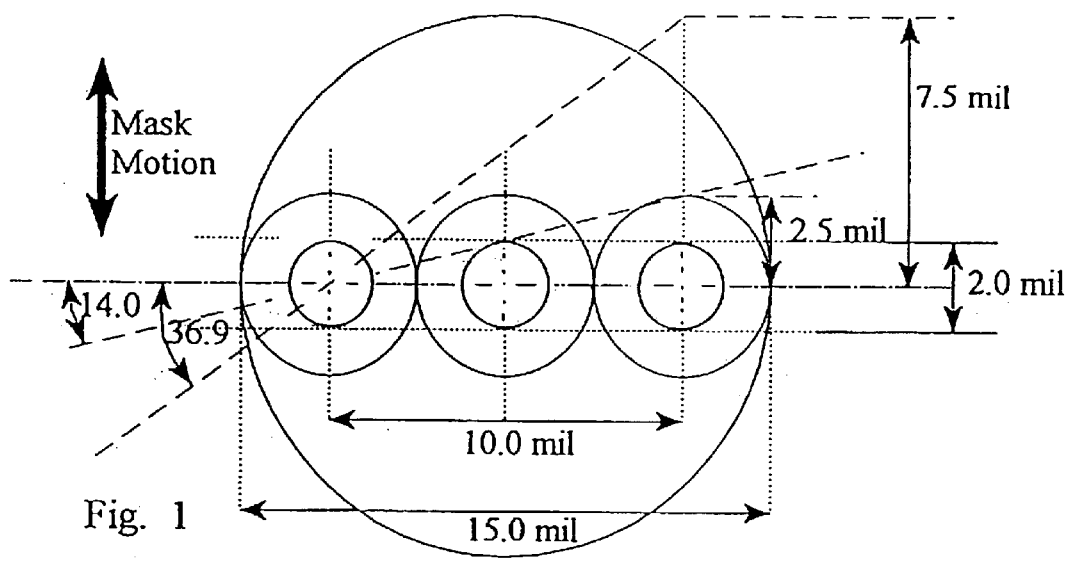
FIGS. 18 and 19 are diagrams for illustrating quadrature in connection with the encoder of FIG. 12.

As illustrated in FIG. 18, 'leading' quadrature requires a 14 degree off-square angle, and 'trailing' quadrature 37 degree off-square angle 'Leading' quad error of +5 deg. gives 19 deg. Spacial error is 3.4–2.5=0.9 mil.

'Leading' quad error of +5 deg. gives 9 deg. Error is 2.5–1.6=0.9 mil.

Total 'leading' error is 1.8 mil.

Figure 19:
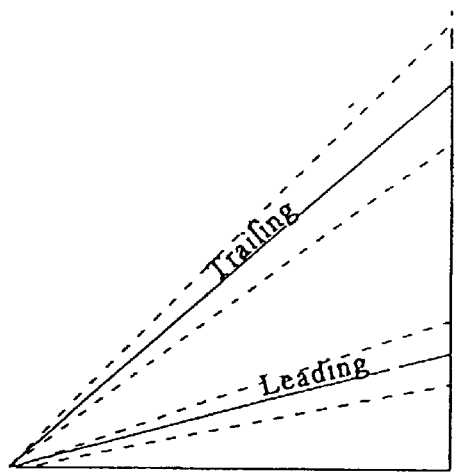

As illustrated in FIG. 19:

'Trailing' quad error of +5 deg. gives 42 deg. Error is 9.0–7.5=1.5 mil.

'Trailing' quad error of −5 deg. gives 32 deg. Error is 7.5–6.2=1.3 mil.

Total 'trailing' error is 2.8 mil.

The above discussion indicates that of-the two options, lending (+90°) or trailing (−276°), the leading option provides the least error.

VISUAL CORROSION MONITOR

Referring to FIGS. 20–25, there is illustrated systems for monitoring the corrosion of metal rebars in concrete. Corrosion detection is achieved through the motion of a sacrificial corrosion probe. The probe is made of the same material as the rebars or a material which has the same corrosion properties. The motion of the probe is then magnified through a lever system.

The Pillings-Bedworth Law of corrosion states that the corrosion product for rebar will have fourteen times the volume of the metal consumed to create it. This substantial volume increase impels the distal tip of the rod in a proximal direction, away from the concrete surface.

Figure 20:
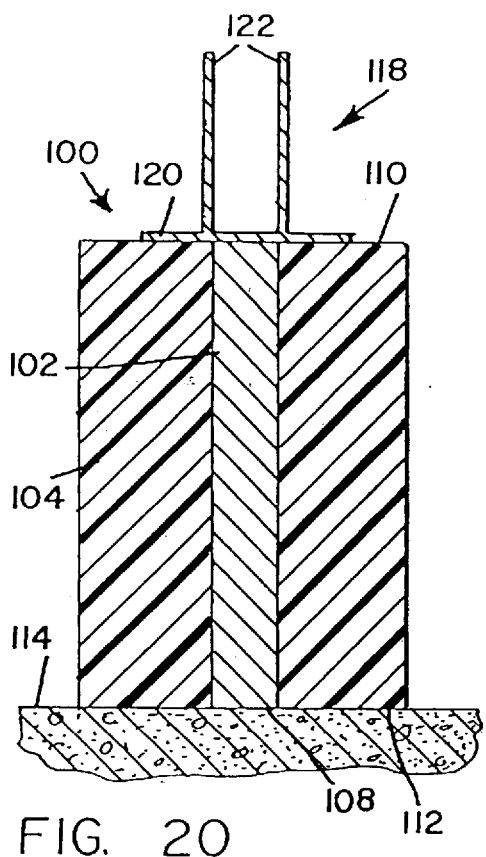
FIG. 20 is a vertical cross-sectional view of a corrosion monitor for rebars in concrete shown in its pre-corrosion indicating state.
Figure 21:
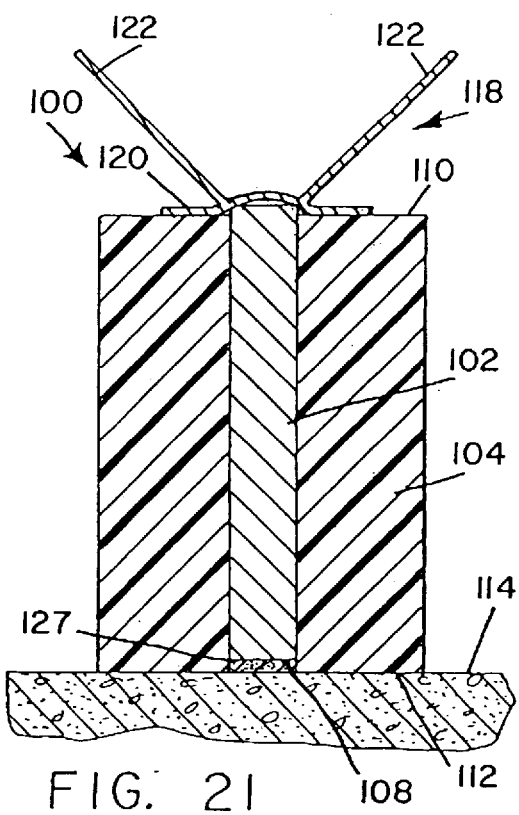
FIG. 21 is a view similar to FIG. 20 showing the corrosion monitor of FIG. 20 in its corrosion indicating state.

Referring first to FIGS. 20 and 21, there is shown a first embodiment of a digital corrosion monitor for concrete, generally indicated by the reference numeral 100. Monitor 100 comprises a sacrificial corrosion probe confined snugly in an elastomeric plastic sleeve 104. The sleeve 104 is preferably made of a high density polyethylene. The sacrificial corrosion probe 102 is made of the same material as the rebars in the concrete structure to be monitored. The probe 102 has an upper end service 106 and a lower end surface 108. The sleeve 104 has an upper end surface 110 which is coplanar with the upper end surface 106 of the probe and a lower end 112 which is coplanar with the lower end surface 108 of the probe. Monitor 100 also includes an indicator, generally indicated by the reference numeral 118 fixed to the upper end of the sleeve. The indicator 118 includes a flat base 120 which if fixed, i.e, by adhesion to the end surface 110 of the sleeve so that it overlies the end surface 106 of the probe and a pair of spaced parallel arms 122 which extend transversely of the base 120.

The monitor 100 is utilized by fixing the inner surface 112 of the sleeve 104, i.e, by adhesion to a surface 114 of a concrete structure 16 to be monitored. Since the end surface 108 of the probe 102 is coplanar with the end surface 112 of the sleeve, it is also in contact with the surface 114 of the concrete structure, as shown in FIG. 20. Over a period of time, corrosion of the probe 102 begins to occur on surface 108 so that the product of corrosion, i.e., rust, begins to build up at the surface 108, as indicated by the reference numeral 127 in FIG. 21. The product of corrosion 127 forces the probe 102 upwardly, relative to the sleeve 104 so that the upper end surface 106 of the probe protrudes beyond the upper end surface 110 of the sleeve, as shown in FIG. 21. This action distorts the central portion of the base 120 upwardly and causes the arms 122 to diverge as shown in FIG. 21. The amount of diversion of the arms 12 represents a significant magnification of the upward motion of the probe 102 cause by the build up of corrosion material 127. The monitoring apparatus 100 enables the end surface 108 of the probe to be in intimate contact with the selected concrete surface but in isolation from any outside environmental influences. The sleeve 104 not only isolates the lower end surface 108 of the probe but also serves to maintain it in contact with the concrete surface during any vibration experienced by the concrete structure. Sleeve 104 also confines the corrosion product so that all volumetric changes at the end surface 108 of the probe is directed to uniaxial motion of the probe away from the concrete surface. Preferably, the probe is made of a stainless steel with a coatable tip at the end of the probe which is in contact with the surface of the concrete. This allows different standard length rods and sleeves to be deployed to differential concrete depth interrogations using essentially the same hardware.

Figure 22:
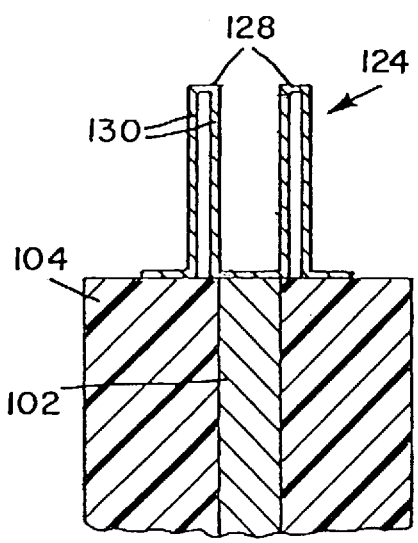
Figure 23:
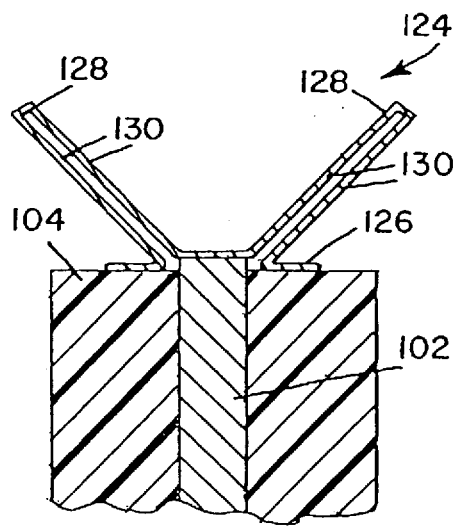

Referring specifically to FIGS. 22 and 23, there is shown a modified indicator, generally indicated by the reference numeral 124. Indicator 124 comprises a base 126 and a pair of spaced parallel arms 128 which extend transversely of the base 126. Each arm 128 comprises a pair of spaced parallel walls 130. The probe 124 is applied to the surface 110, the sleeve 104 in the same manner as the indicator 118 and functions in a similar manner. The arms 128 diverge significantly in response to a small movement of the probe 102 relative to the sleeve 104 as illustrated in FIG. 21.

MODIFIED VISUAL CORROSION MONITORING SYSTEM

Figure 24:
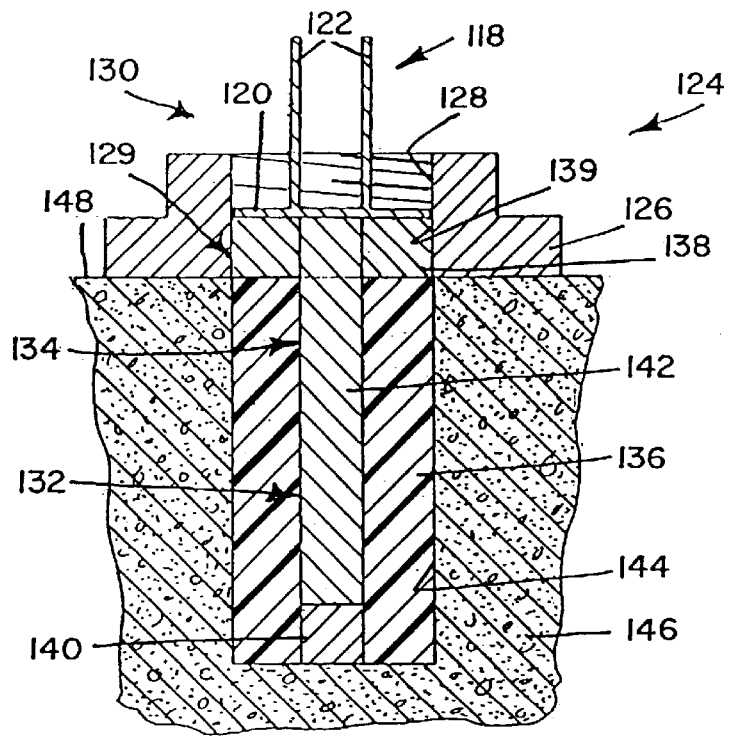
FIG. 24 is a vertical cross-sectional view of a modified corrosion monitor shown in its pre-corrosion indicating state.
Figure 25:
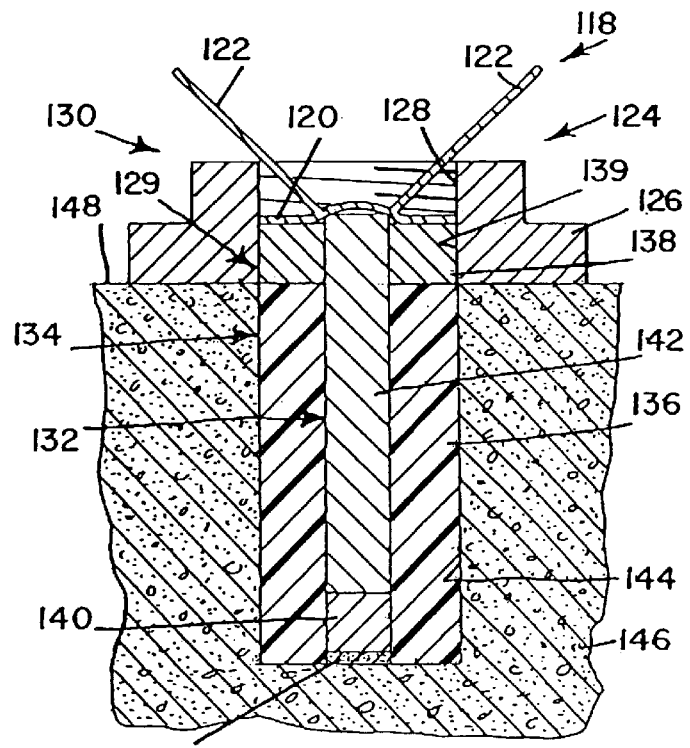
FIG. 25 is a view similar to FIG. 24 showing the corrosion monitor in its corrosion indicating state.

Referring to FIGS. 24 and 25, there is shown a modified visual corrosion monitoring apparatus, generally indicated by the reference numeral 124. Monitoring apparatus 124 comprises a mounting plate 126 and an insert assembly, generally indicated by the reference numeral 130. The Mounting plate 126 has a threaded bore 128.

The insert assembly 130 comprises a probe, generally indicated by the reference numeral 132, a sleeve 136, and a cap, generally indicated by the reference numeral 129. The cap 129 includes a ring 138 and previously described indicator, generally indicated by the reference numeral 118. The ring 138 has a central cylindrical aperture 139 and external threads on its outer side surface. The base 120 of the indicator 118 is fixed to the outer end surface of the ring 138. The probe 132 has an outer ceramic portion 142 which has the same low thermal expansion coefficient as concrete. Once such ceramic material is a product sold by Corning Glassworks under the tradename of Ceram or a glass which contains an oxide of boron sold under the tradename Pyrex. The probe 138 has an inner portion 140 is made of a material which is identical to the rebar material or of a material which has the same corrosion characteristics as the rebar material. The sleeve 136 is made of an elastomeric thermoplastic material, such as high density polyethylene. The probe 132 is located snugly within the inner end surface of the inner portion 140 of the probe is coplanar with the inner end surface of the sleeve 136. The probe 132 and the sleeve 136 form a sleeve/probe assembly, generally indicated by the reference numeral 134.

The corrosion monitoring apparatus 124 is utilized by boring a cylindrical hole 144 in a concrete structure 146 to be monitored. Mounting plate 126 is fixed to the outer surface 148 of the concrete structure 146 so that the bore 128 of the mounting plate is concentrally aligned with the bore 144 of the concrete structure. The sleeve/probe assembly 134 is inserted through the bore 128 of the mounting plate and force fed into the bore 144 of the 15 concrete structure until the inner end surfaces of the probe 132 and the sleeve 136 abut the concrete at the inner end of the hole 144. The cap 129 is threaded into the bore 128 of the mounting plate 126 so that the outer end of the ceramic portion 142 of the probe enters the bore 139 of the cap and rests against the base portion 120 of the indicator 118, as shown in FIG. 24. Preferably, the arms 122 are normally tilted inwardly toward one another and are impelled to the vertical and parallel position shown in FIG. 24 when the cap 129 is tightened so that an upward force is exerted against the base 120 by the upper end of the ceramic portion 142 of the probe. When the end surface of the corrosion portion 140 of the probe which is in contact with the concrete structure begins to corrode a product of corrosion, indicated by the reference numeral 150, develops between the probe and the concrete structure. This forces the probe 132 upwardly to distort the central portion of the base 120 of the indicator 118 and to force the arms 122 into a diverting position as shown in FIG. 25.

Since rust-induced probe expansion in quite small on an absolute scale, the leveraging system must be sensitive to small changes in length. Outside structures, such as bridges, experience great changes in temperature so that differential expansion between a probe and the concrete could effect the readings of the indicator. Since the major portion of the probe 132 is made of a material which has a the same expansion coefficient as the concrete, the probe and the concrete will always be in thermal equilibrium and have the same thermal diffusivity properties so that there will be no or little effect on the indicator due to temperature changes.

The advantages of the corrosion monitoring apparatus 124 is that it allows for easy assembly, fool proof calibration, and hermetic sealing of the bore hole of the concrete. The large arm motion of the indicator 118 may be used as a direct visual sensor. The arm motion may also be used a remote sensor by attaching an optical fiber adjacent one arm so that a reflected signal goes away when the arm reaches the preset position. The corrosable portion 140 may be removed for either inspection or replacement by unscrewing the cap 138 without disturbing the rest of the mounting assembly.

In many cases, there is a need to know the specific agents of concrete degradation as well as the overall effect of rebar corrosion. In such instances, the lower corrodible portion 140 would be made of different metals other than the steel of concrete rebar. For example, aluminum could be used since it is a specially susceptible to chlorine-bearing chemical corrosion. Aluminum, therefore, would be used to give an early indication of potential chlorine build up in the concrete. Other metal which are susceptible to pH changes, sulfate concentration, and straight current-induced corrosion could also be employed.

It is customary in the bridge monitoring industry to take core samples of concrete from the bridge deck areas suspected of being chemically compromised. It is possible to configure the monitor so that is will fit into the bore hole created during sampling so that there will be a minimum of disruption and a simultaneous sense of base line arising from the standard core analysis.

Figure 26:
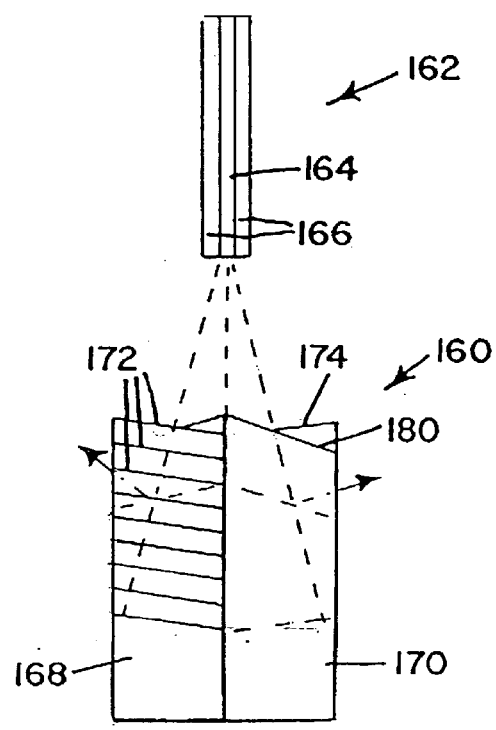
FIG. 26 is an end view of a binary optical reflector module.
Figure 27:
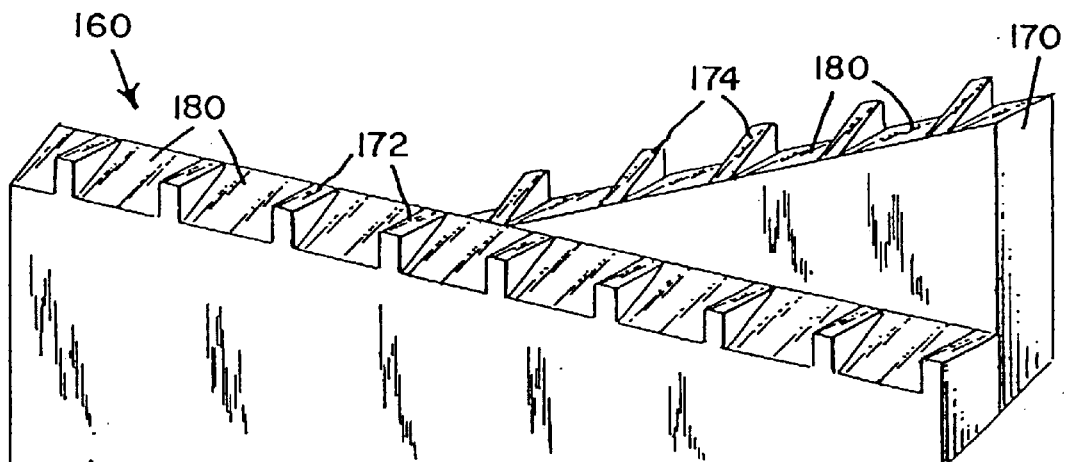
FIG. 27 is an isometric view of the binary optical reflector module of FIG. 26.
Figure 28:
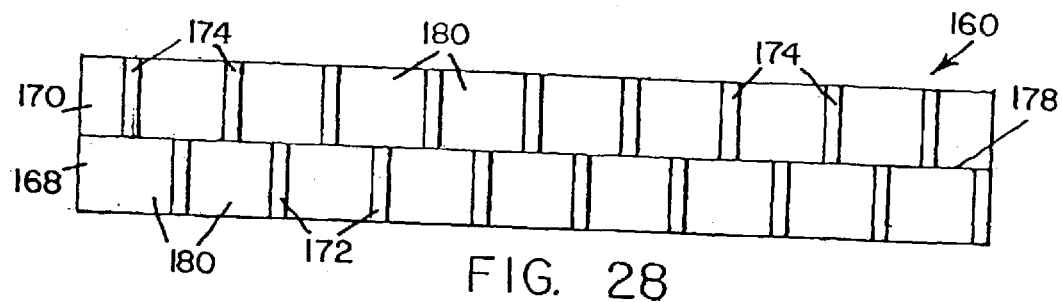
FIG. 28 is a top plan view of the binary optical reflector module of FIG. 26.

Referring to FIGS. 26–28 there is illustrated a binary optical reflector module, generally indicated by the reference numeral 160. The binary optical reflector module 160 is used in conjunction with a three optical fiber system, generally indicated by the reference numeral 162. The optical fiber system includes a central light transmission fiber 164 located between two light reception fibers 166.

The angled encoder described above does not give a large differential in power between the two fibers for absolute position location. The longer the strip, the smaller the power differential. What is sometimes needed is an encoder that exhibits a higher differential signal between the two light reception fibers 166, end to end.

Binary optical reflector module 160 includes a pair of wedge shaped mirror bodies 168 and 170 which are arranged side by side and which slant downwardly in opposite directions. Mirror body 168 has reflector surfaces 172 which slant longitudinally and transversely downwardly towards the mirror body 170. Mirror body 170 has reflector surfaces 174 which slant longitudinally and transversely downwardly towards mirror body 168. This will cause the alternate reflected optical signals to come back from reflector surfaces at different heights, except at the mid point where they will be the same. At the extreme ends of the bodies 168 and 170, the difference will be the greatest. By using two opposed slanted reflector surface arrays, the differential between the two return fibers is maximized and equally accurate across the range of the reflector surface arrays. To assure proper illumination of the two groups of reflector surfaces 172 and 174 and to minimize off-center shadowing, the reflector surfaces 172 and 174 are slanted inwards at about seven degrees to refocus the emitted light beam. The reflector surfaces 172 are staggered relative to the reflector surfaces 174 the reflector surfaces in each of the groups 172 and 174 are spaced from each other by a 1:5 ratio. Each reflector surface in each group is staggered midway between two adjacent reflector surfaces of the other group of reflector surfaces. [Note that the reflector surfaces 172 and 174 could be staggered to give quadrature with the fibers in an axis-orthogonal lineup.] The deflector surfaces 180 are slanted away from the midline 178 to assure the maximum extinction ratio. Reflector surface location would be the result of ratioing the two adjacent bits by one or both fibers.

As shown in FIGS. 26 and 27, the reflector surfaces 172 and 174 are tilted in towards the center line 178 between strips 168 and 170 at seven degrees to maximize signal return to the optical fibers 166. The areas between the reflector surfaces are polished deflector surfaces 180 which are tilted away from the center line 178 at eighteen degrees to maximize signal rejection. Both sets of reflector surfaces 172 and 174 reflect light from fiber 164 to both fibers 166. The longitudinal distance between each reflector surface in a group is five times the longitudinal dimension of each reflector surface.

The wedge-shaped mirror bodies 168 and 170 are identical and can be molded as individual pieces. Two of the pieces are positioned side by side so that the two pieces face in opposite directions and the deflector surfaces 180 slant downwardly and outwardly from the abutting surfaces of the two pieces. The two pieces are then fixed together, i.e. by gluing to form the completed module 160. Each wedge-shaped piece can also be made by machining. The completed module 160 can also be molded as a single unit.

Figure 29A:
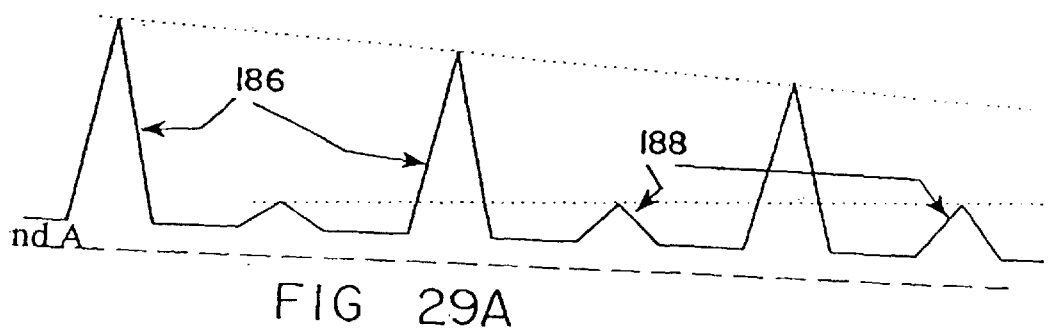
FIG. 29A is a diagram showing the pulse sequence for each set of reflector services at one end of an encoder mirror strip.
Figure 29B:
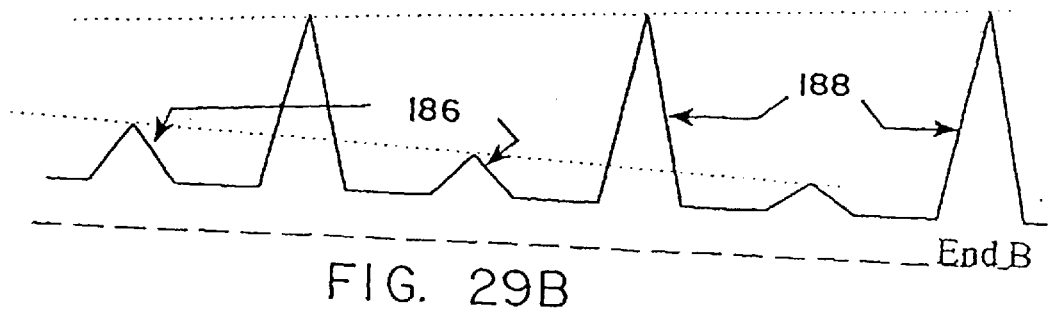
FIG. 29B shows the pulse sequence for each set of reflective services at the opposite end of the of the strip.

FIG. 29 shows the pulse sequence for each set of reflector surfaces at one end of the strip and FIG. 30B shows the pulse sequence for each set of reflector surfaces at the opposite end of the strip. The pulses of the first set of reflector surfaces are indicated by the reference numeral 186. The pulses of the second set of reflector surfaces are indicated by the reference numeral 188.

Figure 30:
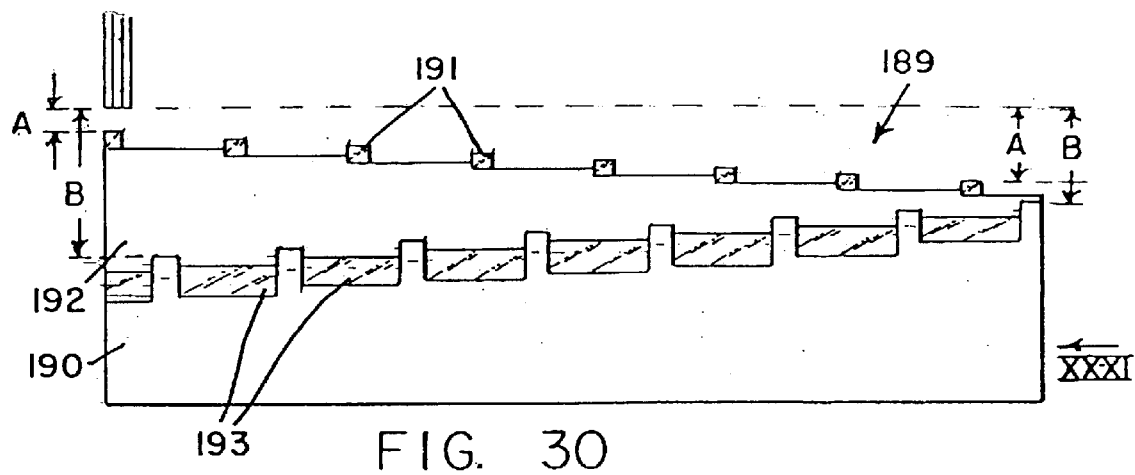
FIG. 30 is a side elevational view of an alternate and arrangement of a binary tilted mirror module.
Figure 31:
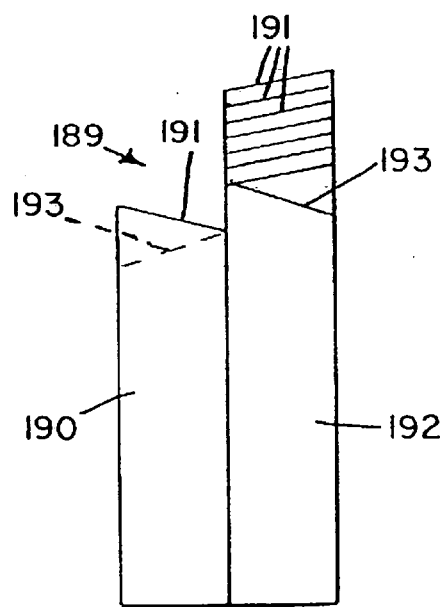
FIG. 31 is an end view of the binary mirror module of FIG. 30, looking in the direction of arrow XXXI of FIG. 30.

FIGS. 30 and 31 show an alternate arrangement of a binary tilted mirror module, generally indicated by the reference numeral 189, where there is no cross-over due to one mirror set being lower than the other mirror set for the entire length of the mirror arrangement. In this way, there is a continuous and tangible A/B power ratio. This arrangement is referred to as an unambiguous binary angled mirror arrangement, The two mirror sets are indicated by the reference numerals 190 and 192.

Each of the mirror sets 190 and 192 has a plurality of spaced reflector surfaces 192 separated by deflector surfaces 193. The longitudinal dimension of each deflector surface 193 is five times the longitudinal dimension of each reflector surface 191. The reflector surfaces of the mirror set 190 are staggered relative to the reflector surfaces of mirror set. 192. The reflector surfaces 191 and the deflector surfaces 192 are not angled along the longitudinal dimension of the mirror sets. The reflector and deflector surfaces are arranged in a regular stepped upward pattern from the low end of the set to the high end of the set.

The advantage of this use of a binary angled mirror arrangement such as that shown in FIGS. 26–31 are:

1. The system is self referencing since one fiber will be close while the other can be far away, compared with a system which employs a single reflector surface array. There, the location is derived from looking at the difference in power of the only slightly mutually displaced quadrature fibers aimed at the same angled reflector surface array.
2. A shallower angle may be used for the binary reflector surface array, due to the self-referencing system, potentially giving the system a greater range of motion or else far higher absolute accuracy.
3. The peak-to-peak referencing is more precise than the single reflector surface array accumulated power differential.
4. The referencing may he conducted by either of the return fibers, in contrast with the mandated use of both return fibers in the single reflector surface array system.
5. This means that, when both of the binary mirror array fibers are employed, two corroborating sets of data as to the bit-to-bit delta will be available for absolute position location purposes.
6. An off-axis angle is used to reflect away the inter-reflective surface light more efficiently than using the light-absorbent materials.
7. The use of a dual mirror system allows the spacing between the reflector surfaces of a single mirror system to be doubled, thereby making fabrication easier.
8. The design lends itself to injection molding for very low cost sensors.
9. The system still uses only three optical fibers in the linear but axis-off-square quadrature alignment.
10. Can be used for self-referenced absolute encoder position purposes.
11. Tilted binary mirrors maximize light return and minimize tolerances in mirror-to-fiber positioning.

FIGS. 32–35 illustrate a method of constructing a binary optical reflector module by using reflector shims 181 and deflector shims 182 and 187. Deflector shim 187 is identical to deflector shim 182 except that it is half as thick. Reflector shim 181 is a solid rectangle except that one edge surface, indicated by the reference numeral 183, is tilted relative the opposite edge surface, i.e. 7°. Each of the deflector shims 182 and 187 is a solid rectangle except that one edge surface, indicated by the reference numeral 184, is tilted relative to the opposite edge surface, i.e. 18°.

Shims 181 are prepared by clamping a plurality, of them in a group so that their edge surfaces 183 are in the same plane. The surface 183 are then polished to a mirror finish to form reflector surfaces. The edge surfaces 184 of shims 182 and 187 are then polished as a group in the same manner to form deflector surfaces.

FIG. 33 shows a plurality of shims 181 and 182 arranged on edge in an alternating pattern on a flat surface. The shims 181 and 182 are placed in a base form 198 in the same alternating pattern. The base form 198 has a pair of parallel oppositely sloping floor surface 199 and 201. A plurality of alternating shims 181 and 182 are positioned on the sloping surface 199 in upright fashion so that the shims form a stepped pattern as shown in. FIG. 34. Shims 181 and 182 are also arranged on the sloping floor surface 201 in an upright alternating pattern except that a narrow shim 187 is employed at each end of the stack of shims. This enables the reflector shims 181 on the floor surface 201 to be staggered relative to the reflector shims 181 on the floor surface 199, as shown in FIG. 34. After all of the shims 181, 182, and 187 are arranged in the base form 198, they are fixed within the form and the form and shims constitute a finished binary optical reflector module, generally indicated by the reference numeral 185, as shown in FIG. 35.

The shims 181, 182, and 187 can also be fixed to each other, i.e. by gluing within the base for 198 and removed as a unit from the form. A wedge-shaped base is then fixed to each row of shims to form an optical relfector module wherein each shim extends vertically and assumes the same stepped pattern as within the base form 198.

Figure 37:
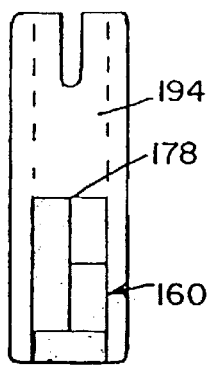
FIG. 37 is an end view of the binary optical reflector module of FIG. 36, looking in the direction of arrow XXXVI of FIG. 36.
Figure 36:
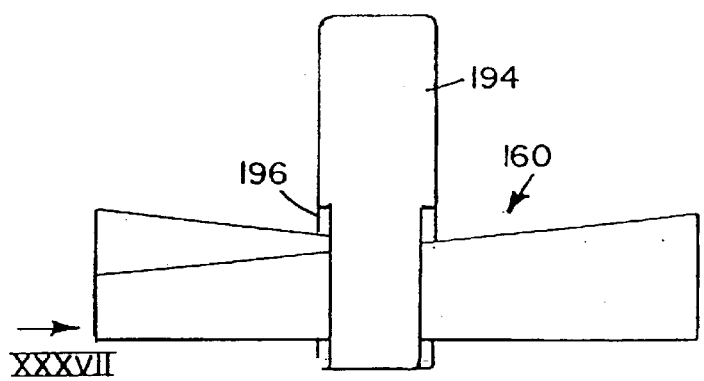
FIG. 36 is a side elevational view of an alignment mechanism for a binary optical reflector module.

FIGS. 36 and 37 illustrate an example of an alignment mechanism for the encoder. The most critical alignment aspect of the system is the optical fiber connector to binary mirror array. One approach to assuring this is to start with a complete splice bushing, such as bushing 194 in FIG. 36 which is designed to align two male connector bushings, and to cut a slot 196 in the walls of the bushing at a set orientation to the alignment key (for quadrature assurance) so that the slot accepts and orientates the binary mirror module, as for example the mirrors module 150 of FIGS. 26 and 27. A single male connector is inserted into the top half of the bushing 194 so that the optical fibers are aligned with the mid-line 178 of the module 160. The upper end of the bushing 194 extends through an aperture in the wall of the encoder housing. Such an approach would minimize all other tolerance in the encoder.

Figure 38:
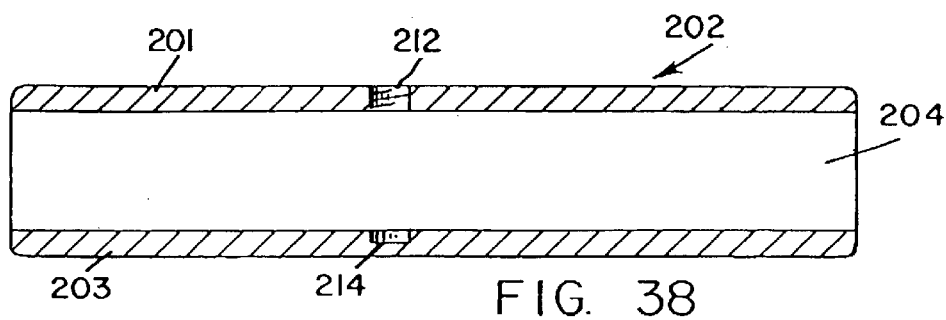
FIG. 38 is a vertical cross-sectional view of an encoder housing which forms part of an alternate connecting arrangement for the optical fiber of an encoder.
Figure 39:
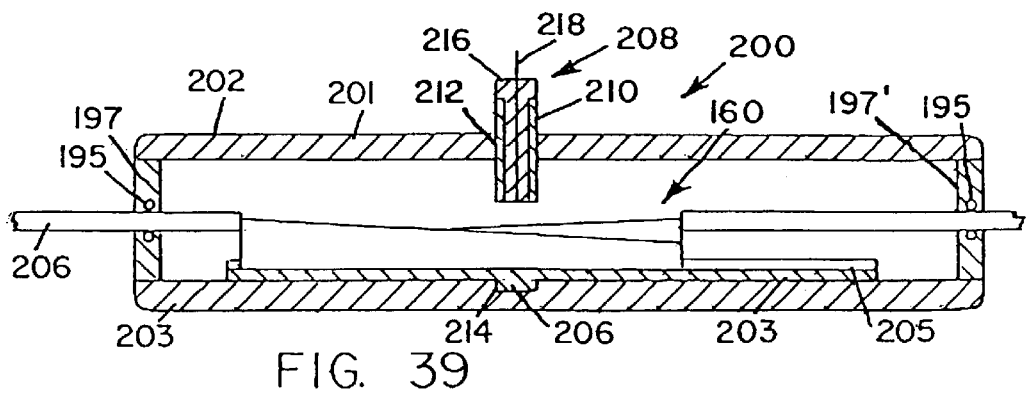
FIG. 39 is a vertical cross-sectional view of an encoder housing containing all of the encoder elements, including the alternate connecting arrangement for the optical: fiber of the encoder.

Referring to FIGS. 38 and 39, there is shown an alternative connecting arrangement for the optical fiber of the encoder, generally indicated by the reference numeral 200, which contains a binary optical reflector module, such as module 160. The encoder 200 includes a housing, generally indicated by the reference numeral 202, an optical fiber connector, generally indicated by the reference numeral 208, and optical reflector module 160. Housing 202 which has an upper wall 201, a lower wall 203, and a chamber 204. A binary optical reflector module such as module 160 is slidably mounted within the chamber 204 and is attached at one end to a linear connector 206. Connector 206 is connected to a first portion of a structure to be monitored. The housing 202 is connected to a second portion of a structure to be monitored which is movable relative to the first portion. The connector extends through an O-ring seal 195 in an end wall 197. A volume balancing rod 206' is attached to the opposite end of the module 160 and extends through an O-ring seal 195 in an end wall 197' at the opposite end of the housing 202. This prevents a pumping action within the housing as the module proves from one end of the housing to the other. A tapped aperture 212 extends entirely through the upper wall 201 to the chamber 204. A hole 214 extends partially into the lower wall 203 from the chamber 204 and is axially aligned with a bushing 210 which is threaded into the aperture 212. This process should create a common alignment between an optical connector 216 which is inserted into the bushing 210, and the encoder array alignment slot, which could be secured in the distal end of the tapped connector bushing hole. The connector 216 contains optical fibers 218. A guide 203 has a longitudinal horizontal groove 105 and protuberance 207 which fits into the hole 214. The guide is fixed to the inner surface of the lower wall 203 so that the grooves 205 is vertically aligned with the optical connector 216. The optical reflector nodule 160 is slidably positioned within the groove 205 so that the fibers 218 of the connector 216 are aligned with the center line of the module 160.

There are a couple of noteworthy ramifications of the use of an encoder which utilizes a binary angled mirror arrangement, the first is that the resolution of the mirror will be the cosine of the angle the mirror is tilted multiplied by the machine resolution. For instance, the 10 mil pitch on the 5° encoder will actually be 9.996 mil.

Figure 40:
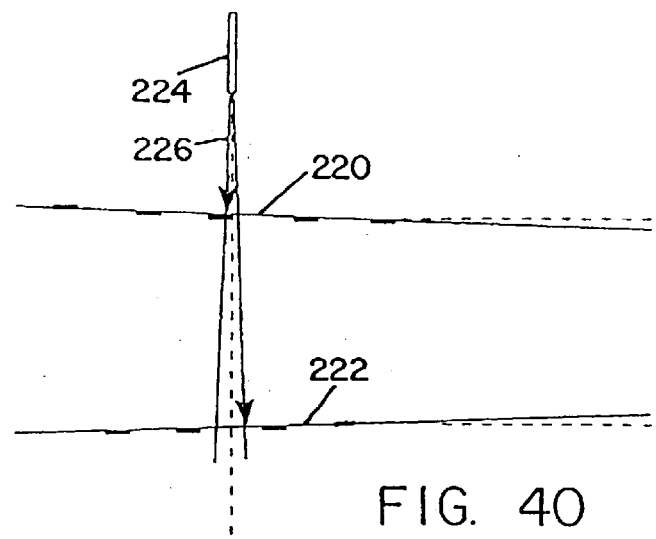
FIG. 40 is a diagrammatic view of illustrating the relationship of the optical fiber and the staggered reflective surfaces of a binary optical reflector module.

The second is more noteworthy and less obvious. This is that the light which comes back to the receiving fibers is that which strikes the mirrors at a 90° or so. With a single tilted mirror, that line is always same and so there's little to remark. However, when using two mirrors at a tangible angle to each other (such as 2° plus 2°, or 4°), then the mirrors being illuminated on each tilted strip are some distance from each other and requiring a care in assuring that they correctly alternate with each other, see FIG. 40. As shown in FIG. 40, the upper (positive slope) mirror array is generally indicated by the reference numeral 220 and the lower (negative slope) mirror array is generally indicated by the reference numeral 222. The transmissive optical fiber is generally indicated by the reference numeral 224 and the beam of the light from the fiber 224 is generally indicated by the reference numeral 226.

The following calculations is to demonstrate that the distance between the two orthogonal light beams, one each to each encoder strip, remains constant as the encoders translate laterally with respect to the optical fiber.

Figure 41:
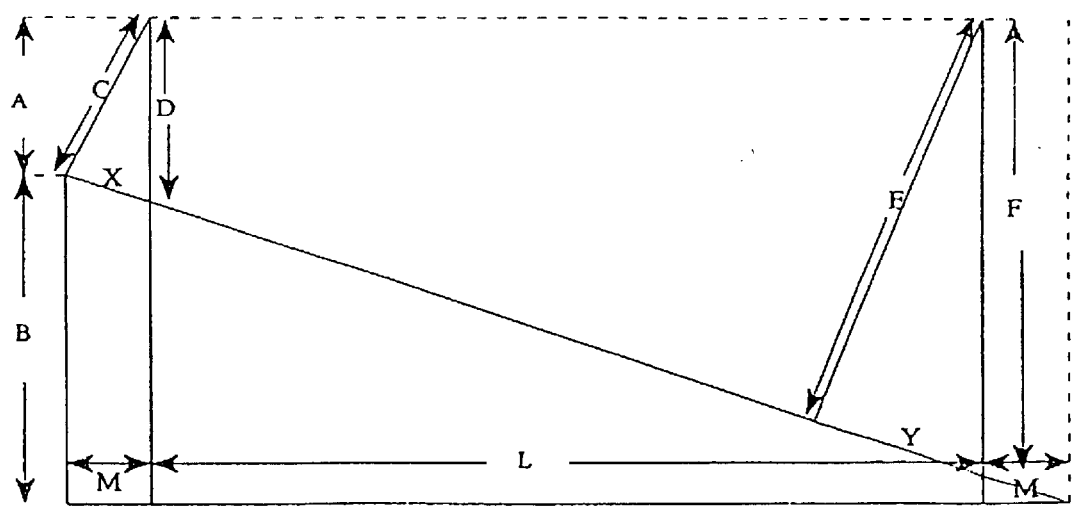
FIG. 41 is a diagrammatic view illustrating the relationship between the light beam of the optical fiber and the binary optical reflector module.
Figure 42:
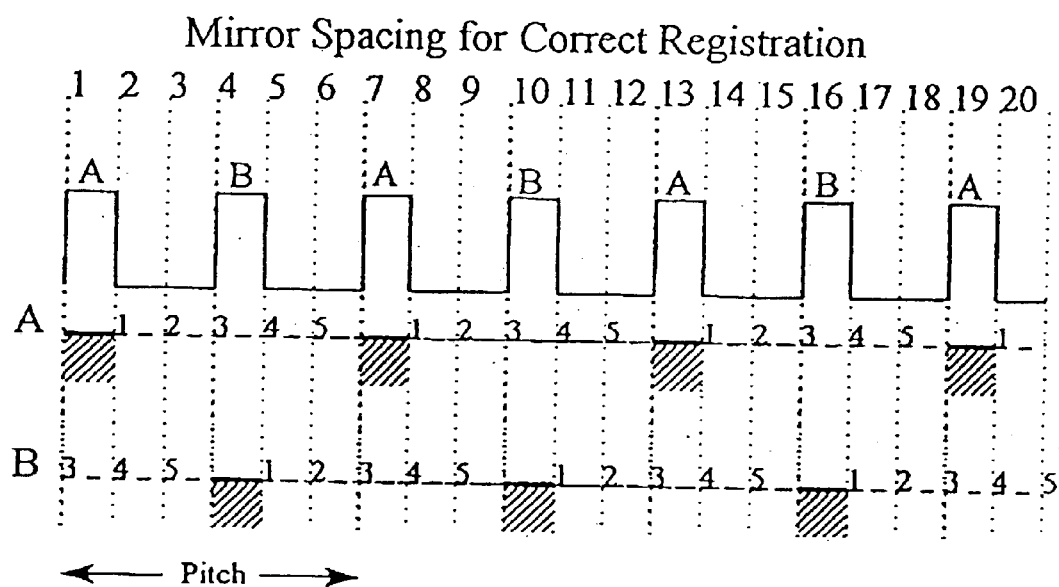
FIG. 42 is a diagrammatic view illustrating the reflective surface spacing for a binary optical reflector module.

FIG. 41 simplifies the calculation by applying two fibers to the same tilted mirror strip, rather than treating two mutually reversed wedge mirror strips with the same fiber. The treatment is equivalent, however, since the EFY triangle is the mirror of that which would lie alongside the CDX triangle if there were two wedges and only one fiber. They way, X+Y is the distance between the two rays which contact the orthogonal mirrors.

From this Figure:

$D = (A+B) - (L+M).\tan \ominus$ where $\ominus$ is the angle of the wedge, and $F = (A+B) - M.\tan \ominus$ therefore, $(D+F) = 2(A+B) - .\tan \ominus (L+2M)$ and $L+@M=$Encoder Length=Constant.

Therefore $(D+F)=$Constant.

Since $E=D.\tan \ominus$, and $Y=F.\tan \ominus$, where $\ominus$ is also a constant, X+Y must be constant.

From the foregoing, $X+Y = D.\tan \ominus + F.\tan \ominus = (D+F).\tan \ominus$ In the extreme where D=A (at the end of the encoder), F=(A+B). Therefore:

$X+Y=(A+A+B).\tan \ominus = (2A+B).\tan \ominus$.

This is the distance between the two wedge-orthogonal rays at any instance on the encoder. For this separation to meet the requirement that the two 1:4 mirrors be equally offset to create a collective 1:2 mirror, this X+Y distance must be adjusted by addition or subtraction of P/2, where P=pitch (1:4) of each mirror, see FIG. 40.

Pitch, "P", is 6×Mirror Width, "M", for each wedge, and correct offset occurs when the distance between the orthogonal beams is multiple of P/2.

A is the height of the fiber end above the highest portion of the angled mirror and B is the mirror's maximum height difference. Whatever this number is for a particular setup, it should have added to it (or subtracted from it) half the pitch, corrected for slope, i.e., $(P/2).\cos \ominus$.

EXAMPLES #1

Pitch=0.020" (for each A and B mirror)

Slope=2°

Length=8"

Fiber Height=A=0.018"

Calculate B:

B=8.tan 2°=0.279366"

(2A+B).tan 2°=0.01101". This is the separation of then two orthogonal mirror beams.

Now add or subtract the Pitch correction:

(P/2).cos $\ominus$=(0.02/2).cos 2°=0.00999"

Thus, the correction is either 0.021004" or 0.00102"

EXAMPLE #2

Pitch=0.020" (for each A and B mirror)

Slope=4°

Length=5"

Fiber Height=A=0.018"

Calculate B:

B=5.tan 4°=0.34963"

(2A+B).tan 4°=0.026966". This is the separation of then two orthogonal mirror beams.

Now add or subtract the Pitch correction:

(P/2).cos $\ominus$=(0.02/2).cos 4°=0.009756"

Thus, the correction is either 0.036722" or 0.01721"

EXAMPLE #3

Pitch=0.020" (for each A and B mirror)

Slope=5°

Length=3"

Fiber Height=A=0.015"

Calculate B:

B=3.tan 5°=0.262"

(2A+B).tan 5°=0.026". This is the separation of then two orthogonal mirror beams.

Now add or subtract the Pitch correction:

(P/2).cos $\ominus$=(0.02/2).cos 5°=0.010"

Thus, the correction is either 0.036" or 0.016"

EXAMPLE #4

Pitch=0.020" (for each A and B mirror)

Slope=5°

Length=1.5"
Fiber Height A=0.015"
Calculate B:
B=(1.5).tan 5°=0.131"
(2A+B).tan 5°=0.014". This is the separation of then two orthogonal mirror beams.
Now add or subtract the Pitch correction:
(P/2).cos ⊖=(0.02/2).cos 5°=0.010"
Thus, the correction is either 0.024" or 0.004"
Development of General Relationship
X+Y=(2A+B).tan ⊖
If X+Y is an integral number of mirror widths, then they must be offset by a factor of three, or half the period, P.
Therefore, 2(X+Y)/P.cos ⊖ should equal an integer, or else adjusted by the fraction of P left over.

EXAMPLE #5

Find offset for Example #1 parameters: (A=0.018"; P=0.02"; B=8.tan ⊖)
Calculation: {2(2A+B).tan 2°/P.cost 2°=(31.5558−31). P.cos 2° Offset
Offset=0.5558×0.020×0.99994=0.01111

Figure 43:
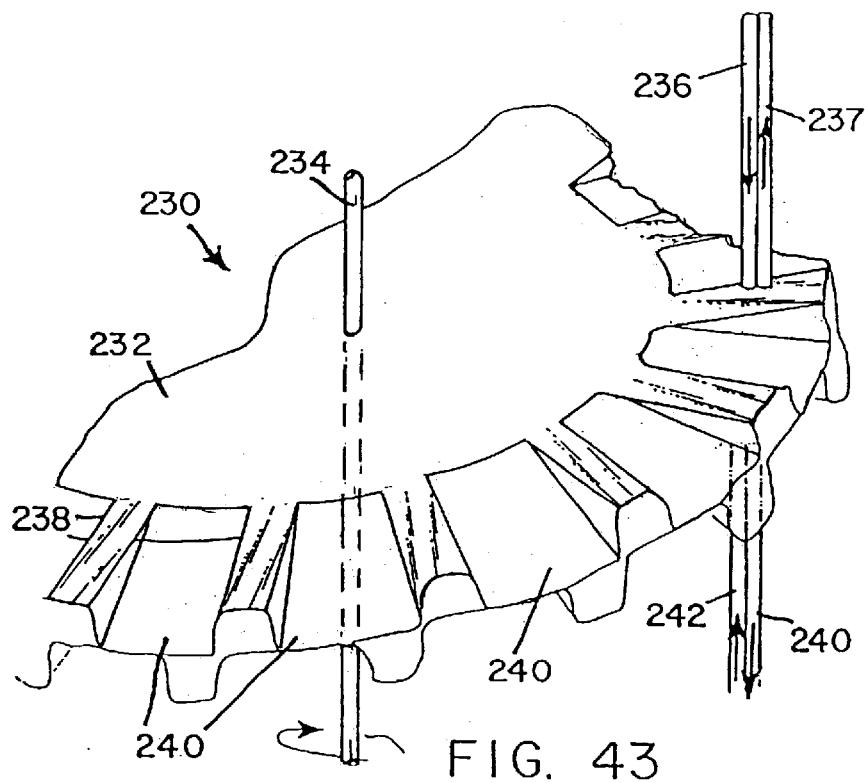
FIG. 43 is an isometric fragmentary view of a rotary reflector module which has binary reflective surfaces.
Figure 44:
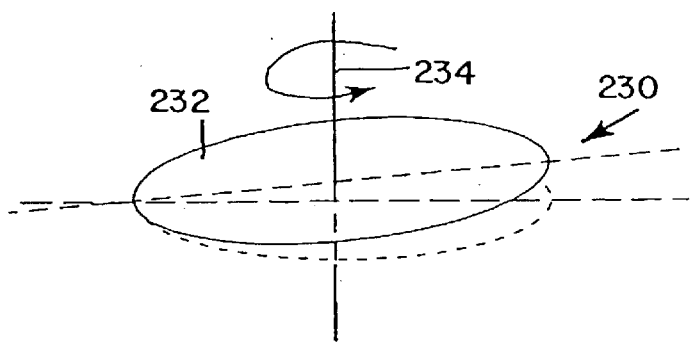
FIGS. 44 and 45 are a diagrammatic views illustrating the eccentric orientation of the rotary encoder module of FIG. 43.
Figure 45:
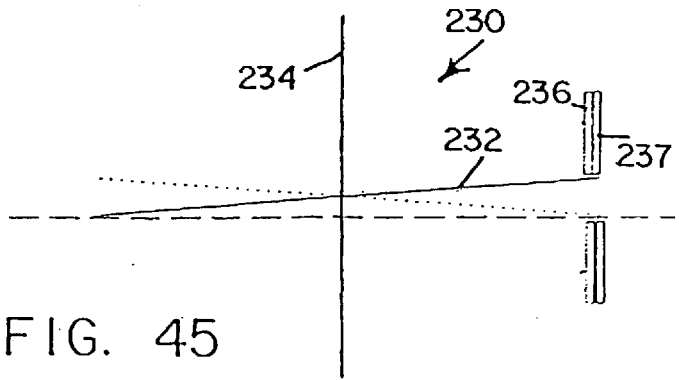
Figure 46:
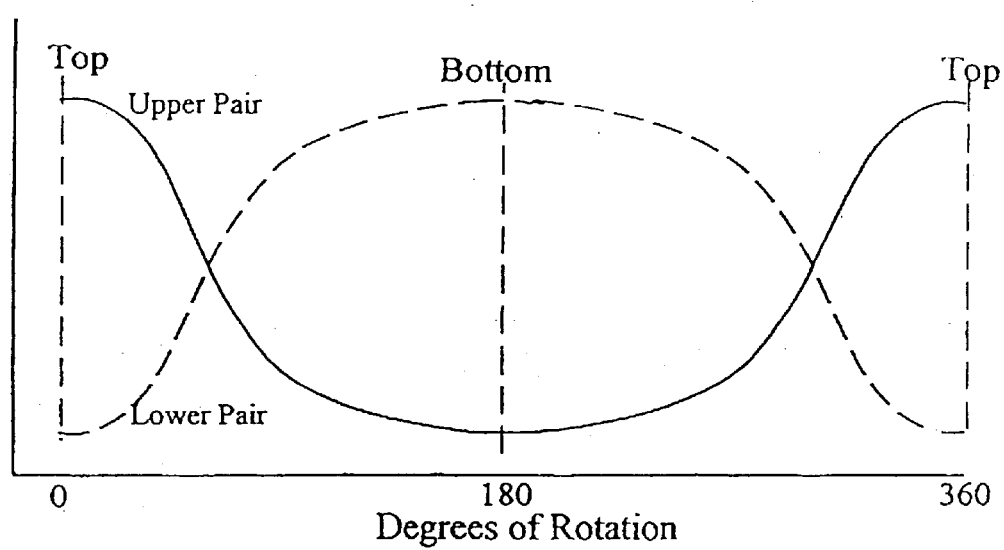
FIG. 46 is a diagrammatic view also illustrating the eccentric orientation of the rotary encoder module of FIG. 43.

Referring to FIGS. 43–45, there is shown a rotary encoder which utilizes the wedge shaped reflector principles of the present invention. The rotary encoder embodiment of the present invention is generally indicated by the reference numeral 230.

Instead of using, as in the case of a linear encoder, two wedges, the rotary encoder 230 of the present invention uses a common reflective disc 232 which is canted at an angle to a plane which is normal to the axis of rotation 234. This enables an upper fiber pair 236 and 237 directed at a particular point near the rim of the disc 232 to see the rim approach and recede as the disc is rotated. The upper pair of fibers includes a light emitting fiber 236 and a light receiving fiber 237. The outer periphery of the disc 232 has a plurality of radially spaced reflector surfaces or mirrors 238. The spacing surfaces 240 between the reflector surfaces 238 are in a plane which is normal to the axis 234.

In the embodiment of FIG. 43, two pairs of fibers are directed at opposite sides of the encoder, one fiber of each fiber pair emitting light and the other fiber of the fiber pair receiving any light reflections from the reflector portions of the encoder disc's rim, as shown in FIG. 41. The lower fiber pair includes a light emitting fiber 242 and a light receiving fiber 244.

The disc is designed so that the spacing of the reflector surface portions 238 delivers the quadrature necessary for directionally determination. Both of the light emitting fibers 236 and 242 are illuminated by a common light source and the two light receiving fibers 237 and 244 can terminate in separate detectors or in the same detector. If they terminate in the same detector, the logic circuitry must be able to both ratio the power of adjacent reflection spikes and determine from the quadrature input that the two respective power peaks have been achieved, the latter for the purpose of verifying the proper power ratios. The power ratio profile follows a sigmoidal rather than linear progression with a rotating and tilted disc, as illustrated in FIG. 44.

The width of the spacing surfaces 240 are five times the width of the reflective surfaces 238. The lower surfaces of the disc 232 has the same reflector surface to spacing surface configuration as the upper surface of disc except that the lower reflector surfaces are radially offset from the upper reflector surfaces, as shown in FIG. 41. The signal disparity between the two sides will indicate the absolute position of the rotary encoder.

What is claimed is:

1. A monitoring system for detecting movement of a first part of a structure relative to a second part of said structure, said monitoring system comprising:
   (a) an interrogation source comprising:
      (1) a light emitting element for emitting pulses of light;
      (2) a first light detecting element; and
      (3) a second light detecting element; and
   (b) an optical encoder comprising:
      (1) a transmiter portion adapted to be connected to the first part of said structure, said transmitter portion having a first optical fiber connected to said light emitting element, a second optical fiber connected to said first light detecting element and a third optical fiber connected to said second light detecting element, said first, second and third optical fibers being located in a row longitudinally of a first longitudinal axis with said first optical fiber being located between said second and third optical fibers, each of said optical fibers having an end surface which lies in a first plane; and
      (2) a reflector portion adapted to be connected to the second part of said structure, said reflector portion comprising a plurality of photo reflective surfaces facing said end surfaces and being spaced longitudinally of said first longitudinal axis,said photo reflective surfaces lying in a second plane spaced from said first plane so that pulses of light from said first light emitting element is transmitted along said first and second optical fibers toward said photo reflective surfaces and said pulses of light reflected from said photo reflective surfaces to the end surface of said second optical fibers is transmitted along said second optical fiber toward said first light detecting element, and said pulses of light reflected from said photo reflective surfaces to the end surface of said third optical fiber toward said second light detecting element, said reflector portion being adapted to be connected to a second part of said structure and movable relative to said transmitter portion along a second longitudinally axis which is at an acute angle to said second plane, so that movement of said reflector portion relative to said transmitter portion along said second longitudinal axis in one direction increases the distance between said end surfaces and said second plane and movement of said reflector portion relative to said transmitter portion along said second longitudinal axis in a direction opposite to said one direction decreases the distance between said end surfaces and said second plane so that the amount of and direction of movement of said second part relative to said first can be determined through the use of quadrature.

2. The monitoring system as recited in claim 1, wherein each of said first and second light emitting elements is a light emitting diode.

3. The monitoring system as recited in claim 1, wherein the width of each of said photo reflective surfaces along said first longitudinal axis which is substantially half that of the distance between adjacent ones of said photo reflective surfaces.

4. The monitoring system as recited in claim 1, wherein said second plane is at an acute angle to said first plane and said second longitudinal axis is parallel to said first plane.

5. The monitoring system as recited in claim 1, wherein said acute angle is not greater than 5 degrees.

6. The monitoring system for a structure as recited in claim 1, wherein said transmitter portion comprises a housing having a chamber, a first end opening to the chamber at one end of the housing, a second end opening to the chamber at the opposite end of the housing, a side opening to the chamber and a ferrule located in said side opening and containing said optical fibers, and wherein said reflector portion comprises a body located within said chamber and a shaft fixed to said body within said chamber and extending through said first and second openings, said body having said photo reflective surfaces.

7. The monitoring system as recited in claim 1, wherein said transmitter portion comprises a housing having a chamber, a first end opening to the chamber at one end of the housing, a second end opening to the chamber at the opposite end of the housing, a side opening to the chamber and a ferrule located in said side opening and containing said optical fibers, and wherein said reflector portion comprises a shaft within said chamber and extending through said first and second end openings, and a wedged shaped encoder strip containing said photo reflective surfaces which face said side opening, said shaft having a central longitudinal axis which is coaxial with said second longitudinal axis.

* * * * *